(12) United States Patent
Ford et al.

(10) Patent No.: US 10,123,223 B1
(45) Date of Patent: Nov. 6, 2018

(54) SYSTEM AND METHOD FOR EVALUATING OPERATIONAL INTEGRITY OF A RADIO ACCESS NETWORK

(71) Applicant: Sprint Communications Company L.P., Overland Park, KS (US)

(72) Inventors: Justin L. Ford, Orlando, FL (US); Drew Shinholster, Maitland, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 5 days.

(21) Appl. No.: 14/169,046

(22) Filed: Jan. 30, 2014

(51) Int. Cl.
*H04W 24/08* (2009.01)

(52) U.S. Cl.
CPC .................................. *H04W 24/08* (2013.01)

(58) Field of Classification Search
CPC .......... H04N 7/14; H04N 17/00; H04W 24/10
See application file for complete search history.

(56) References Cited

U.S. PATENT DOCUMENTS

| | | | |
|---|---|---|---|
| 5,914,668 A * | 6/1999 | Chavez, Jr. ....... | H04M 1/72519 340/7.27 |
| 5,987,099 A | 11/1999 | O'Neill et al. | |
| 6,115,610 A | 9/2000 | Goetz et al. | |
| 6,216,002 B1 | 4/2001 | Holmring | |
| 6,539,221 B1 | 3/2003 | Vasudevan et al. | |
| 6,587,686 B1 | 7/2003 | Cuffaro et al. | |
| 6,745,011 B1 | 6/2004 | Hendrickson et al. | |
| 6,842,620 B2 | 1/2005 | Smith et al. | |
| 7,236,767 B1 | 6/2007 | Cankaya et al. | |
| 7,237,767 B2 | 7/2007 | Sakakibara et al. | |
| 7,454,022 B2 * | 11/2008 | Neumann ............... | H04S 1/002 381/307 |
| 7,693,042 B1 | 4/2010 | Wei | |
| 7,778,591 B1 * | 8/2010 | Van Hoff ............... | H04H 60/13 455/2.01 |
| 7,903,625 B1 | 3/2011 | Srinivas et al. | |
| 8,005,644 B1 | 8/2011 | Evans et al. | |
| 8,145,186 B1 | 3/2012 | Vaughan | |

(Continued)

OTHER PUBLICATIONS

FAIPP Office Action dated Sep. 5, 2014, U.S. Appl. No. 13/607,485, filed Sep. 7, 2012.

(Continued)

*Primary Examiner* — Frantz Bataille

(57) ABSTRACT

A method of evaluating operational integrity of a radio access network is provided. The method comprises using a computer that includes a transceiver, a processor, a non-transitory memory, and application stored in the memory. When executed by the processor, the application receives a satisfaction metric that is coarse grained. The satisfaction metric is associated with the user's perceptions of a communication quality between the radio access network and a mobile communication device. The application determines a mobile communication device identifier, a network connection identifier, and a geolocation of the mobile communication device. A history of wireless communication is determined. The application analyzes the determined elements and associates the satisfaction metric with a communication type. A message is generated and is transmitted to a communication service provider associated with the radio access network.

20 Claims, 7 Drawing Sheets

(56) References Cited

U.S. PATENT DOCUMENTS

| | | | |
|---|---|---|---|
| 8,145,560 B2* | 3/2012 | Kulkarni | G06Q 40/00 379/114.14 |
| 8,170,547 B1 | 5/2012 | Bhan et al. | |
| 8,229,415 B1 | 7/2012 | Chen et al. | |
| 8,423,035 B1 | 4/2013 | Dinan et al. | |
| 8,570,955 B2 | 10/2013 | Viorel et al. | |
| 8,600,384 B1 | 12/2013 | Moreno et al. | |
| 8,627,125 B2* | 1/2014 | Kashyap | G06F 1/3206 345/212 |
| 8,825,759 B1* | 9/2014 | Jackson | H04L 67/02 705/14.69 |
| 8,880,600 B2* | 11/2014 | Lento | G06Q 10/10 709/204 |
| 8,966,055 B2 | 2/2015 | Mittal et al. | |
| 9,210,600 B1 | 12/2015 | Jadunandan et al. | |
| 9,432,865 B1 | 8/2016 | Jadunandan et al. | |
| 2001/0036825 A1 | 11/2001 | Martin | |
| 2002/0068559 A1 | 6/2002 | Sharma et al. | |
| 2002/0069037 A1 | 6/2002 | Hendrickson et al. | |
| 2002/0177448 A1 | 11/2002 | Moran et al. | |
| 2003/0078055 A1 | 4/2003 | Smith et al. | |
| 2003/0100317 A1 | 5/2003 | Kaplan et al. | |
| 2003/0161265 A1 | 8/2003 | Cao et al. | |
| 2004/0127224 A1 | 7/2004 | Furukawa et al. | |
| 2005/0014492 A1 | 1/2005 | Kang et al. | |
| 2005/0064820 A1 | 3/2005 | Park et al. | |
| 2005/0096842 A1 | 5/2005 | Tashiro | |
| 2005/0192001 A1 | 9/2005 | Samuel | |
| 2006/0183471 A1 | 8/2006 | Samuel et al. | |
| 2006/0217116 A1 | 9/2006 | Cassett et al. | |
| 2007/0004394 A1 | 1/2007 | Chu et al. | |
| 2007/0026886 A1 | 2/2007 | Vincent | |
| 2007/0105583 A1 | 5/2007 | Gerlach | |
| 2007/0288480 A1 | 12/2007 | Caplan et al. | |
| 2008/0045245 A1 | 2/2008 | Billmaier et al. | |
| 2008/0152104 A1 | 6/2008 | Keeler et al. | |
| 2008/0207221 A1* | 8/2008 | Chari | H04W 48/18 455/456.1 |
| 2008/0215355 A1 | 9/2008 | Herring et al. | |
| 2008/0219365 A1 | 9/2008 | Viorel et al. | |
| 2008/0233936 A1 | 9/2008 | Rajan et al. | |
| 2009/0054056 A1* | 2/2009 | Gil | H04L 41/5009 455/423 |
| 2009/0055719 A1 | 2/2009 | Cossins et al. | |
| 2009/0075648 A1 | 3/2009 | Reed et al. | |
| 2009/0111462 A1* | 4/2009 | Krinsky | H04W 24/08 455/423 |
| 2009/0161850 A1 | 6/2009 | Raymer et al. | |
| 2009/0164551 A1 | 6/2009 | Oesterling et al. | |
| 2009/0248711 A1 | 10/2009 | Martinez et al. | |
| 2009/0275335 A1 | 11/2009 | Jalloul et al. | |
| 2009/0286526 A1 | 11/2009 | Matsunaga | |
| 2009/0296674 A1 | 12/2009 | Ekl et al. | |
| 2010/0015926 A1 | 1/2010 | Luff | |
| 2010/0099405 A1 | 4/2010 | Brisebois et al. | |
| 2010/0151920 A1 | 6/2010 | Song et al. | |
| 2010/0234031 A1 | 9/2010 | Lidron | |
| 2011/0143748 A1 | 6/2011 | Shah et al. | |
| 2011/0166986 A1 | 7/2011 | Graham et al. | |
| 2011/0201317 A1* | 8/2011 | Karandikar | G06Q 30/02 455/414.1 |
| 2011/0275364 A1 | 11/2011 | Austin et al. | |
| 2011/0313695 A1 | 12/2011 | Houston et al. | |
| 2011/0320588 A1 | 12/2011 | Raleigh | |
| 2012/0058759 A1 | 3/2012 | Lundborg et al. | |
| 2012/0096065 A1 | 4/2012 | Suit et al. | |
| 2012/0120078 A1 | 5/2012 | Hubbard | |
| 2012/0295618 A1 | 11/2012 | Ahmavaara et al. | |
| 2013/0052019 A1 | 2/2013 | Ions et al. | |
| 2013/0053019 A1 | 2/2013 | Schilling | |
| 2013/0072222 A1* | 3/2013 | Weill | H04W 64/00 455/456.1 |
| 2013/0091452 A1 | 4/2013 | Sorden et al. | |
| 2013/0151696 A1* | 6/2013 | Huang | G06F 11/3419 709/224 |
| 2013/0157652 A1 | 6/2013 | Khaitan et al. | |
| 2013/0331082 A1* | 12/2013 | Topaltzas | H04W 24/06 455/419 |
| 2013/0331114 A1 | 12/2013 | Gormley et al. | |
| 2014/0003389 A1 | 1/2014 | Wang et al. | |
| 2014/0022918 A1 | 1/2014 | Guo et al. | |
| 2014/0078992 A1 | 3/2014 | Khandekar et al. | |
| 2014/0177430 A1 | 6/2014 | Hassett | |

OTHER PUBLICATIONS

Notice of Allowance dated Jul. 24, 2015, U.S. Appl. No. 13/607,485, filed Sep. 7, 2012.
First Action Interview Office Action dated Jul. 24, 2015, U.S. Appl. No. 14/135,574, filed Dec. 19, 2013.
Final Office Action dated Jan. 21, 2015, U.S. Appl. No. 13/607,485, filed Sep. 7, 2012.
FAIPP Pre-Interview Communication dated Apr. 21, 2015, U.S. Appl. No. 14/135,574, filed Dec. 19, 2013.
Notice of Allowance dated Apr. 22, 2016, U.S. Appl. No. 14/135,574, filed Dec. 19, 2013.
Jadunandan, Kevin, et al., Patent Application entitled "Wireless Network Performance Analysis System and Method", filed on Sep. 7, 2012, U.S. Appl. No. 13/607,485.
Jadunandan, Kevin, et al., Patent Application entitled, "Wireless Cell Tower Performance Analysis System and Method" filed on Dec. 19, 2013, U.S. Appl. No. 14/135,574.
FAIPP Pre-Interview Communication dated Mar. 25, 2014, U.S. Appl. No. 13/607,485, filed Sep. 7, 2012.
Final Office Action dated Nov. 9, 2015, U.S. Appl. No. 14/135,574, filed Dec. 19, 2013.
Advisory Action dated Jan. 29, 2016, U.S. Appl. No. 14/135,574, filed Dec. 19, 2013.

* cited by examiner

SYSTEM AND METHOD FOR EVALUATING OPERATIONAL INTEGRITY OF A RADIO ACCESS NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Technological improvements to mobile communication devices provide greater abilities to communicate and access information. Yet these improvements also tend to place increasing demands upon the radio access networks that are servicing the mobile devices. As demands upon radio access networks grow, network operators are under increased pressure to supply service that will satisfy customer needs. To provide radio links to mobile devices, radio access network operators build and maintain a large number of cell towers or cell sites. For example, a large wireless network providing national coverage may comprise more than 50,000 cell sites. Customers expect network operators to supply ubiquitous coverage that will accommodate their device's improved capabilities. However, customers can become frustrated when the quality of network service does not meet their expectations. This can foster negative connotations about the radio access network operator without regard to mitigating factors that may have contributed to the subpar customer experience.

The quality of radio access network communication service provided by cell sites depends on a number of different factors such as the number of subscribers in a coverage area of the cell site, the radio signal strength of the cell site, and the local environment including foliage. Because these factors change with population distributions and the seasons, it is a challenge for radio access network providers to evaluate the operational integrity of their network and the perceived quality of service provided to their customers.

SUMMARY

In an embodiment, a method of evaluating operational integrity of a radio access network is disclosed. The method comprises using a computer that includes a transceiver, a processor, a memory, and an application stored in the memory. When executed by the processor, the application receives a satisfaction metric from a user input. The satisfaction metric is coarse grained and is associated with the user's perception of a communication quality between the radio access network and a mobile communication device. The application further determines a mobile communication device identifier that is associated with the mobile communication device, a network connection identifier, and a history of wireless communication between the mobile communication device and the radio access network. The history of wireless communication spans a predefined timeframe and identifies a communication type. The communication type includes at least one of voice communication or data communication. The application further analyzes the network connection identifier and history of wireless communication. Responsive to the analysis, the application associates the satisfaction metric with a communication type. The application further generates a message that comprises the satisfaction metric, the mobile communication device identifier, the network connection identifier, geolocation of the mobile communication device, and history of wireless communication. The application further transmits the generated message to a communication service provider associated with the radio access network.

In an embodiment, a system for maintaining a radio access network is disclosed. The system comprises a feedback data store that comprises a plurality of messages. Each of the plurality of messages comprises a satisfaction metric that is coarse grained and is associated with the user's perception of a communication quality between the radio access network and a mobile communication device. The satisfaction metric is associated with at least one of voice communication or data communication. The messages also comprise a mobile network identifier that is associated with the mobile communication device and a network connection identifier. The system further comprises a status data store that comprises metrics that are associated with at least one base transceiver station. The metrics of the status data store include at least one of performance metrics, network upgrade metrics, or trouble ticket metrics. The system further comprises a server that includes a processor, a non-transitory memory, and an application stored in the non-transitory memory. When executed by the processor, the application receives a plurality of messages from the feedback data store, analyzes the plurality of messages received from feedback data store, and identifies a geolocation of each mobile communication device associated with each message. The application further identifies at least one base transceiver station that corresponds to each mobile communication device associated with each message. The application receives at least one of the metrics from the status data store corresponding to the identified at least one base transceiver station. The application further analyzes the plurality of messages received from the feedback data store with at least one of the metrics from the status data store, wherein the analysis determines whether a correlation exists between at least a subset of the plurality of messages and the at least one of the metrics received from the status data store. Responsive to a determination that a correlation exists, the application transmits a notification to a communication service provider of the radio access network that identifies the existing correlation.

In an embodiment, a method of evaluating operational integrity of a radio access network is disclosed. The method comprises receiving, by a server, a plurality of messages corresponding with one of a plurality of mobile devices. Each message comprises a mobile communication device identifier, a network connection identifier, and a satisfaction metric that is a coarse grained metric. The coarse grained metric comprises one of a plurality of discrete options. The satisfaction metric is associated with the user's perception of a communication quality between the radio access network and a corresponding mobile communication device. The method further comprises analyzing each message by a server. Based on the analysis of each message, the method further identifies a geolocation of each of the plurality of mobile communication devices. Responsive to identifying the geolocation of each of the plurality of mobile communication devices, the method determines at least one base transceiver station for each corresponding mobile communication device. The method associates the determined at least one base transceiver station with a corresponding message. A network server analyzes the plurality of messages, the corresponding at least one base transceiver station, and the corresponding identified geolocations against at least one of performance metrics, network upgrade metrics, or trouble ticket metrics. At least one of the performance metrics, network upgrade metrics, or trouble ticket metrics are associated with the corresponding at least one base transceiver station. Further, the method comprises generating a request for a detailed explanation about the satisfaction metric corresponding to one of the plurality of messages. The request for a detailed explanation is transmitted to a user associated with the corresponding message.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
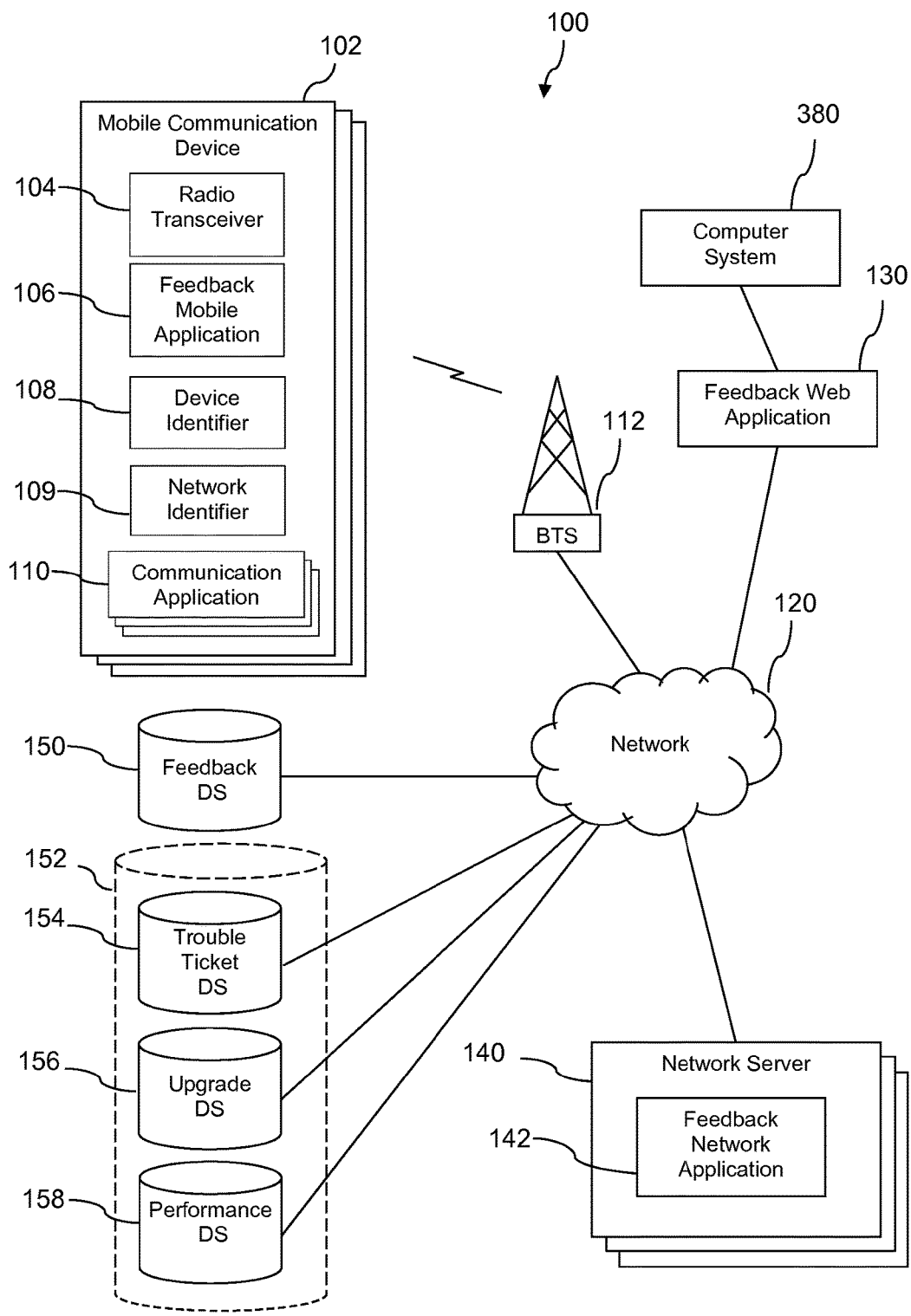
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for evaluating and maintaining operational integrity of a radio access network is taught herein. Communication service providers strive to maintain and grow their customer base by providing a reliable baseline level of performance and quality when customers use their wireless network. Although providers may know of problems with the network, feedback from network users provides real-world understanding of the operations perceived by a user. Yet users may not feel that they have the time or patience to fill out long feedback surveys or talk with a customer representative about their experience. Additionally, mobile communication device users travel to multiple locations covered by the network, and thus their experience while using the network may vary depending on their present location and activity.

For example, the user of a mobile communication device may be attending a sporting event at a large public stadium and desires to use a smartphone to connect to the Internet. However, after attempting to engage with websites or use certain mobile applications, the user may feel that they are not receiving data quickly enough. Irrespective of actual network functionality, a user may attribute their inadequate experience with a failure on the part of the communication service provider. Unbeknownst to the user, the provider may have just installed new communication equipment proximate to the stadium and believes the network is functioning at optimal levels. Instead of users merely venting their frustration to a friend, a system and method may be employed for evaluating a user's perception of network communication quality while capturing contextual factors and minimizing the burden of providing feedback.

In an embodiment, a feedback application on a mobile communication device is utilized to provide feedback to a communication service provider. Upon execution of the feedback application, the user inputs a satisfaction metric that is coarse grained—such as selecting from icons like thumbs up, thumbs down, or a plurality of stars. The satisfaction metric corresponds with a level of satisfaction the user perceives in being able to communicate on a mobile communication device via the network. The location of the mobile communication device is determined to assist in contextualizing the satisfaction metric and identifying components of the network, such as cell towers. Some embodiments allow a user to visualize the radio access network on an interface by displaying cell towers on a virtual map relative to the user's location. The user can interact with the map by selecting and rating individual cell towers that communicatively couple their mobile communication device to the network. To minimize confusion, some embodiments of the virtual map may display only the towers corresponding to the voice and/or data communication currently or previously used by the mobile communication device. Some embodiments require authorization before users may access the virtual map displaying the network.

Instead of anonymous feedback, an application can automatically collect information for understanding the source, cause, and context of the feedback from the mobile communication device. Such information can include identifying source information like the type of mobile communication device in use, operating system information, or the identification of the user inputting the feedback. Additionally, the feedback application contextualizes user rated communication type by determining the network connection that is engaging with the network. If asked directly, a user may not know the type of wireless protocol they are using, and thus would have difficulty providing a technically accurate response. Thus, to determine the communication type to which the satisfaction metric pertains, the application may use a network connection identifier and/or the history of wireless communication to reference the current and former wireless protocol in use for association with a communication type. The application may associate a communication type with the satisfaction metric—such as data communication over Long Term Evolution (LTE)—without the user having to directly input this information. Some embodiments have the mobile communication device engage in a communication test when a satisfaction metric is inputted, while other embodiments engage in a communication test upon initiation by a communication service provider.

The inputted and determined contextual information is sent to a communication service provider, or component thereof, which is associated with the radio access network providing the communication. The user may also be sent a request for providing detailed feedback at their convenience by using a different device and/or interface. Upon transmission to the communication service provider, the provider may identify whether action should be taken based on the feedback, such as engaging in a communication test.

In an embodiment, an application of the network receives feedback information from a data store for asynchronous analysis of the feedback information and other data. The network application identifies the relevant base transceiver station used by the mobile communication device and receives metrics about the base transceiver station, such as performance, upgrade, or trouble ticket metrics from a data store. Such metrics can be analyzed against satisfaction metrics to determine whether correlations exist, thereby allowing a communication service provider to take further action. The determination of existing correlations may depend on analysis results that exceed a predefined threshold. For example, a provider may designate an application to engage in a communication test with mobile communication devices when two criteria are met—such as i.) more than half of the received satisfaction metrics from a specific device manufacturer indicate dissatisfaction and ii) cell tower upgrades have recently been performed on a corresponding cell tower. While attending a sporting event at a large public stadium, multiple users may submit satisfaction metrics. Analysis may determine that over half of submitted satisfaction metrics associated with a particular device manufacturer are thumbs down, and their location indicates recent upgrades were made to the corresponding cell tower. Because the predefined threshold is exceeded, the existing correlation prompts an application to engage a communication test with specified devices. Such information allows the service provider the ability to identify and address issues with the network to maintain, evaluate, and improve its operation.

Turning now to FIG. 1, a communication system 100 is described. In an embodiment, the system 100 comprises at least one mobile communication device 102, a feedback data store 150, a trouble ticket data store 154, an upgrade data store 156, and a network server 140. The network server 140 may be a computer system that executes one or more applications for cellular network communication feedback 142. The mobile communication device 102 may comprise a radio transceiver 104, a feedback mobile application 106, at least one device identifier 108, at least one network identifier 109, and a plurality of communication applications 110. The mobile communication device 102 is configured to use the radio transceiver 104 to establish a wireless communication link with at least one base transceiver station (BTS) 112, and the base transceiver station 112 provides communications connectivity of the mobile communication device 102 to a network 120. One skilled in the art will appreciate that the functionality provided by the components 104, 106, 108, 109, 110 may be combined into fewer components or partitioned among more components.

It is understood that the system 100 may comprise any number of mobile communication devices 102 and any number of base transceiver stations 112 and/or cell sites or towers. The collectivity of base transceiver stations 112 may be said to comprise a radio access network, in that these base transceiver stations 112 and/or cell sites may provide radio communication links to the mobile communication devices 102 to provide access to the network 120. The cell sites and/or base transceiver stations 112 may provide radio communication links to mobile communication devices 102 using one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, an iDEN wireless protocol, or another wireless protocol.

The network 120 may comprise any combination of private and public networks. The network 120 may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102. The network 120 may also comprise the internet to receive and/or transfer information to a provider associated with the radio access network. For example, a computer system 380 may access a feedback web application 130 via the Internet to provide information associated with the radio access network, such as perceived communication quality, to a communication service provider. A network server 140 may communicatively couple with the network 120 and may run applications such as a feedback network application 142, which is disclosed hereinafter.

The mobile communication device 102 may be any of a mobile phone, a personal digital assistant (PDA), a media player, a tablet, a wireless enabled computer, or other mobile communication device 102. In an embodiment, the mobile communication device 102 may have other components (not shown) such as a near field communication (NFC) radio transceiver, a wireless local area network (WLAN) radio transceiver, or other components.

The radio transceiver 104 may communicate with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

The device identifier 108 ensures that an object being identified is able to be distinguished from other objects—such as other devices or components—that have similar characteristics and/or qualities. In an embodiment, the device identifier 108 may comprise any of an identifiable character, symbol, and/or string thereof, on a piece of hardware, or as stored as software or firmware in the memory of the mobile communication device 102. As used herein, it is understood that the term mobile communication device identifier refers to a device identifier 108 that identifies any of the mobile communication device 102, hardware, software, or firmware that is used by the mobile communication device 102. The device identifier 108 may be associated with any of a user of the mobile communication device 102, a device component, or an account of the network 120 communication service provider.

The device identifier 108 may be associated with at least one user of the identified mobile communication device 102, and/or a communication service account of the communication service provider that is associated with the identified mobile communication device 102. It is understood that a component of the network 120 may be coupled to a data store that may comprise account information of subscribers using the radio access network that is associated with the communication service provider. Such account information—pertaining to subscribers and/or users of the radio access network—may be provided to applications via the network 120. The device identifier 108 may be accessible from a mobile communication device 102 and/or via the network 120.

Additionally, the device identifier 108 may enable identification of any of a manufacturer, device hardware, a serial number, a model number, a subscriber identity module (SIM), an integrated circuit card identifier (ICCID), a dialable number associated with the mobile communication device 102, or other components of the mobile communication device 102 or components associated with therein. Alternatively, the device identifier 108 may refer to the identity and/or allow identification of a unique identifier. For example, in the case of a mobile communication device 102, a unique identifier may be any of an equipment identification number (EIN), international mobile station equipment identity (IMEI), international mobile subscriber identity (IMSI) or another unique identifier.

In an embodiment, the device identifier 108 may be provided by a user input or from a source other than the item or object being identified. For example, an application may determine a device identifier 108 by prompting a user to input a device identifier 108. The device identifier 108 may comprise a user inputted dialable number that is assigned to the device 102, or a user inputted manufacturing serial number, such as an IMEI. Alternatively, an application may automatically determine a device identifier 108—such as a mobile communication device's serial number—by referring to any of a component of the mobile communication device 102, a storage, or via the network 120.

In an embodiment, a device identifier 108 may be determined by interacting with a component of the network 120—such as receiving identifying information from a data store on the network 120. The determination of a device identifier 108 allows for the identification of, among other things, a user of the mobile communication device 102 so that associations can be made with the user, such as an associated network 120 account. It is understood that a single mobile communication device 102 or a single component of the mobile device 102 may have a plurality of device identifiers 108, where each may be associated with one another. For example, a mobile communication device 102 may have a first device identifier 108—an IMEI—and a second device identifier 108—a dialable number that is assigned to the device 102. The associations of multiple device identifiers 108 may be accessible via the network 120.

In an embodiment, a device identifier 108 may use the identification, or be used in the identification, of a first mobile communication device 102 to identify subsequent mobile communication devices 102 that are associated with the first mobile device 102. An application—such as a feedback mobile application 106, a feedback network application 142, and/or a feedback web application 130—may reference associations between multiple mobile communication devices 102, where the associations may be loaded and stored in a memory of the mobile communication device 102 or may be accessible via the network 120. The term feedback application refers to any of a feedback mobile application 106, a feedback network application 142, or a feedback web application 130. For example, a first user of the mobile communication device 102 may hold a user account with the communication service provider. The user account may associate one or more mobile communication devices 102 with the first user's mobile communication device 102. By referencing a user account of the communication service provider, multiple device identifiers 108 associated with the user account may be obtained—such as the manufacturer and model number of a plurality of mobile communication devices 102 in a particular geolocation or under a particular user account. References may be made with applications, such as a feedback mobile application 106, a feedback network application 142, a feedback web application 130, and/or another application.

For example, a user of a first mobile communication device 102 may be experiencing trouble sending data communication over the radio access network. The user may provide feedback to the communication service provider—such as by inputting a satisfaction metric of the user's perception of communication quality between the mobile communication device 102 and the radio access network to a feedback data store 150 associated with the communication service provider. To ensure that the first mobile communication device 102 is working properly, a feedback application 106, 130, 142 (i.e., any of a feedback mobile application 106, feedback web application 130, or a feedback network application 142) may rely on a first device identifier 108 of a first mobile communication device 102 to identify a second device identifier 108 of a second mobile communication device 102 so that diagnostics—such as a communication test—can be run on either, or both, of the first and second mobile communication devices 102. In this example, the second mobile communications device 102 may not have provided feedback to the communication service provider, but is simply associated with the user account of the first mobile communication device 102. In some embodiments, a feedback application 106, 130, 142, may engage in testing of multiple mobile communication devices 102 based on certain characteristics and/or associations—such as a communication service provider (or component thereof) conducting a radio access network communication test. The communication test may engage a predefined number of mobile communication devices 102 that associate with a certain manufacturer that is identified with a device identifier 108, and the mobile communication device 102 are within a predefined geographic location of radio access network coverage.

The mobile communication device 102 may comprise a plurality of communication applications 110. The communication applications 110 may comprise any of a voice communication application, a data communication application, a web browser application, an email application, a short message system (SMS) or texting application, a multimedia message system (MMS) application, or other communication applications. The communication applications 110 may be standard communication applications that are delivered by an original equipment manufacturer (OEM) who assembles the mobile communication device 102. The communication applications 110 may be stored as firmware or software in the memory of the mobile communication device 102. The communication applications 110 may expose application programming interfaces (API's) accessible to other applications or software, for example to feedback applications 106, 130, 142, and/or a network identifier 109, to provide wireless communication protocol information and/or functionality to the other applications.

In an embodiment, applications—such as, but not limited to, communication applications 110—may collect a variety of data about the use of communication applications 110. In some contexts, this collection of data may be referred to as a history of wireless communication or communication history of the mobile communication device 102. For example, communications applications 110 may generate logs and/or store logs of communication activities such as voice call records, data call records, browser sessions, short message service messages, texts, wireless communication protocol usage, or types of communication over wireless communication protocols. The communication applications' 110 logs of communication activities may be accessible to other applications, such as feedback applications 106, 130, 142. Alternatively, the feedback applications 106, 130, 142 may generate logs of their activities and may be accessible via the network 120.

The mobile communication device 102 may comprise a network identifier 109. The network identifier 109 may comprise any of hardware, software, or firmware and may be stored in the memory of a mobile communication device 102 and/or in a data store accessible via the network 120. In an embodiment, the network identifier 109 may identify or be used in the identification of a variety of wireless communication protocols—such as CDMA, WiMAX, and other network protocols previously described—and/or elements inside of networks like components or ports. The network identifier 109 may also identify a variety of data associated with the use of the mobile communications device 102 via the radio access network—such as the type of communication being transmitted over the wireless communication protocols, including but not limited to voice and/or data communication via the network 120. For example, but without limitation, the network identifier 109 may identify the mobile communication device 102 transmitting and/or receiving voice communication over a GSM wireless communication protocol, or identify transmission of data communication over an LTE wireless communication protocol. The network identifier 109 may be configured to associate with a mobile communication device identifier 108, then determine the wireless communication protocol that is communicatively coupling the mobile communication device 102 with the network 120.

In an embodiment, the network identifier 109 may be used to identify, and/or receive an identification of, at least one base transceiver station 112 that is communicatively coupling the associated mobile communication device 102 to the network. For example, a user of a mobile communication device 102 may be experiencing problems with data communication over the radio access network. Determining the network identifier 109 may enable the identification of the specific wireless protocol at issue—for example 3G or 3G High Speed Packet Access (HSPA). In some embodiments, the information—such as the network identifier 109—may be determined automatically by a feedback application 106, 130, 142. The determination may be asynchronous with other determinations. An application may also analyze other information associated with the network identifier 109—such as referencing the geolocation of the user's mobile communication device 102—to determine a possible base transceiver station 112 that promotes the identified wireless protocol at issue and is within a predefined area relative to the identified geolocation of the user's mobile communication device 102. It is understood that information about base transceiver stations 112 may be stored on a data store that is accessible via the network 120. In an embodiment, a network server 140 may assist in identifying the location of the mobile communication device 102 associated with the network identifier 109, by analyzing information on a data store that provides the identification of the base transceiver station 112 to the requesting application or device.

In an embodiment, the network identifier 109 may be determined by a feedback application—mobile 106, network 142, and/or web 130—configured for referring to API's exposed by communication applications 110 in order to obtain information about any of wireless communication protocols, the type of communication being transmitted over the radio access network, and/or technical information associated with the communicative coupling of the mobile communications device 102 via base transceiver stations 112. For example, the types of communications transmitted may include data and/or voice communication, and technical information may include the state of a mobile communication device's 102 battery, the energy usage of the mobile communication device 102, the strength of wireless signal levels received by the mobile communication device 102, or other technical specifications used in diagnosis and verification of mobile communication devices 102. A network identifier 109 may also be referred to as a network connection identifier.

In an embodiment, a feedback mobile application 106 identifying and/or determining a network identifier 109 may yield information about a particular mobile communication device 102 and/or for a plurality of mobile communication devices 102. For example, an application may utilize a mobile communication device identifier 108 to identify a plurality of mobile communication devices 102 that are communicatively coupled to a network 120. Upon identifying the mobile communication devices 102, the application may aggregate the identified mobile communication devices 102 according a characteristic shared between the identified mobile communication devices 102—such as the wireless communication protocol, mobile communication device 102 manufacturer, and/or base transceiver stations 112 that communicatively couples the corresponding mobile communication devices 102 to the network 120. In an embodiment, identification of the shared characteristic pertaining to the aggregation may be accomplished by utilizing identity information obtained by or from the network identifier 109 and/or a device identifier 108.

The communication system 100 includes one or more storages 150, 152, 154, 156, 158 and one or more servers 140. The storages 150, 152, 154, 156, 158 can be a memory device capable of storing program instructions and/or data. It is understood that a storage may be referred to as a data store. As illustrated in FIG. 1, the storages 150, 152, 154, 156, 158 are communicatively coupled to components of the network 120. While the storages 150, 152, 154, 156, 158 are illustrated in FIG. 1 as directly coupled to the network 120, it is understood that the storages 150, 152, 154, 156, 158 may be coupled to a network server 140 via a direct communicative coupling. In an embodiment, software and/or data that is stored on a data store may be segmented according to base transceiver stations 112 and/or cell sites. One skilled in the art will appreciate that the functionality provided by the storages 150, 152, 154, 156, 158 may be combined into fewer components or partitioned among more components.

The performance data store 158 may comprise a variety of data and/or metrics on cell sites, base transceiver stations 112, and/or radio sectors thereof. For example, data and/or metrics about call drops, call blocks, network faults, evolution data only (EV-DO) drops, and other cell site performance related metrics may be stored in the performance data store 158. Some of the data and/or metrics about call drops, call quality, and/or call blocks may be provided by probes stationed in the serving areas of cell towers. As known by one of ordinary skill in the art, a probe may be similar to a mobile phone and may attempt to originate calls. Unlike a mobile phone, the probe is operated automatically, collects metrics on blocks and drops, and provides this data back to the performance data store 158 or other node in the service provider's network. Data collected from real mobile devices and data from probes may be distinguished and may promote presenting data associated with real mobile devices separately from data associated with probes.

The performance data store 158 may comprise data and/or metrics about data communication activities and data and/or metrics about voice communication activities. The performance data store 158 may comprise data and/or metrics about short message service (SMS) communication activities. The performance data store 104 may comprise data about how many voice calls or data sessions are handled by a base transceiver station or cell tower during different units of time, for example numbers of calls or sessions per hour, per day, per week, and/or per other unit of time. The data store 158 may receive data and/or metrics updates, for example count updates, on a regular basis.

The performance data store 158 may store both raw counts of call drops, call blocks, network faults, and EV-DO drops as well as performance metrics derived from or calculated based on the raw counts. The raw counts may be periodically processed to derive call drop rates, call block rates, EV-DO drop rates, EV-DO call failure rates, network fault alarm rates, and other rate based performance metrics. Alternatively, the raw counts may be processed when an accumulation of unprocessed raw counts exceeds a predetermined threshold. In an embodiment, the metrics may be determined at the cell sites and/or at a server in the wireless service provider network and written into the performance data store 158 periodically or aperiodically. At least some of the rate based performance metrics may be determined as a percentage of opportunities, for example as a percentage of all calls attempted and/or as a percentage of all calls connected. The raw counts and the rate based performance metrics may be linked to or associated to a radio sector and/or cell site identity and a market identity.

In an embodiment, some rate based performance metrics may be determined by processing all counts accumulated over an hour, a day, a week, a month, or some other interval of time. Some counts may be processed to form per unit of time derived metrics for a plurality of different time units. For example, a raw data may be processed to derive each of a per hour count, a per day count, and a per week count. Some counts may be excluded from rate based performance metric calculations, for example counts accumulated on Mother's Day and/or holidays may be excluded as being non-representative of performance. Thus, there may be a single dropped call rate, a single blocked call rate, a single EV-DO dropped call rate, and a single network fault alarms rate associated with each radio sector of a cell site and/or cell site. In an embodiment, the rate based performance metrics may be determined based on counts that accumulate during a peak usage period of time, for example during a weekday busy hour. In an embodiment, some rate based performance metrics may be determined for each of a plurality of different time periods. For example, a different blocked call rate may be determined for each of a morning period, an afternoon period, an evening period, and a late night period. For example, a blocked call rate may be determined for each hour of the day. In an embodiment, a blocked call rate may be determined for weekends and a separate blocked call rate may be determined for weekdays. The rate based performance metrics may be determined or calculated periodically over the most recent time window. Alternatively, the rate based performance metrics may be determined or calculated after a predefined number of counts accumulate.

The upgrade data store 156 may contain information and/or metrics about cell site enhancements or capacity upgrades associated with the cell sites and/or base transceiver stations 112. The enhancements and/or capacity upgrades may be entered into the upgrade data store 156 up to two years before the commissioning of the upgrades. A metric may be based on a number of enhancements or capacity upgrades associated with the cell sites and/or base transceiver stations 112. It is understood that metrics based on upgrades are referred to as upgrade metrics and may be stored in the upgrade data store 156. In an embodiment, the information about cell site enhancements and/or capacity upgrades may be stored in another data store or accessed by a network server 140 from another source. For example, the information about cell site enhancements, capacity upgrades, and other infrastructure improvements may be stored in the performance data store 158. Upgrades or enhancements may include capacity upgrades of a wired communication link between the cell site and a wired network, for example the public switched telephone network.

The trouble ticket data store 154 may contain information and/or metrics about known issues or problems associated with the performance of a network 120. A metric may be based on a number of trouble tickets opened that are associated with a market, geographic location, cell site, and/or base transceiver station 112. It is understood that metrics based on trouble tickets are referred to as trouble ticket metrics and may be stored in the trouble ticket data store 154. For example, information pertaining to a customer care call associated with a user—who is experiencing problems with the communicative functioning of a mobile communication device—may be stored in a trouble ticket data store 154. Metrics may be created from these trouble tickets and used by a feedback application 106, 130, 142 to compare customer feedback with known trouble tickets. Trouble tickets may be associated with a plurality of markets into which a radio access network is conceptually partitioned. Trouble tickets may also be segregated and/or aggregated based on the geolocation of the experienced problem. Information stored on the trouble ticket data store 154 may be associated with information from other sources, for example an upgrade data store 156 or a performance data store 158.

In an embodiment, storages 154, 156, 158 may be collectively referred to as a status data store 152. The status data store 152 may comprise individual and/or collective metrics related to performance, network upgrades, and/or trouble tickets. Collective metrics of a status data store 152 may be referred to as status metrics to indicate the present "status" and/or state of known functionality pertaining to a variety of operations and/or equipment associated with the radio access network. For example, a feedback application 106, 130, 142 may analyze user feedback information about network communication quality from a feedback storage 150, locate corresponding cell sites and/or base transceiver stations 112, and determine whether a correlation exists between the user feedback information and status metrics associated with the corresponding cell sites and/or base transceiver stations 112. The metrics of the status data store 152 may associate with cell sites and/or base transceiver stations 112 and may be asynchronously analyzed against messages and feedback information corresponding to the associated cell sites. Some embodiments allow an application to configure status metrics for visualization on a virtual map. An application may present the geolocations of corresponding cell sites and/or base transceiver stations 112 on an interface—such as a virtual map displayed on a tablet computer showing an overlay of cell sites, metrics, and information from a storage, such as a feedback data store 150. A storage of the network 120 may include information about the geolocation of cell sites and/or base transceiver stations 112, and such information may be accessed by applications, such as feedback applications 106, 130, 142 via the network 120. An application may present the subject cell sites in a map view that features the different radio sectors of the cell sites. The map view may promote rapidly identifying a cell sector failure as a culprit in a sudden degradation of the wireless communication experienced by a customer that caused the user to input a satisfaction metric signifying an unsatisfactory level of perceived communication quality. Examples of rapidly identifying a cell sector include associating information about the radio access network with each cell sector such that when a user selects the cell sector, the associated information about the network 120 is presented on an interface. Selecting a radio sector and/or base transceiver station 112 on an interface may present corresponding metrics—such as status metrics—for analysis and/or visualization by an application and/or a communication service provider.

Alternatively, a user may select a cell site, sector, and/or base transceiver station 112 on a virtual map presented on a display interface. Selection of a base transceiver station 112 may allow a feedback application 106, 130, 142 to receive input a satisfaction metric that is associated with the user's perception of a communication quality for wireless communication promoted by the selected base transceiver station 112. In an embodiment, the cell sites and/or base transceiver stations 112 presented on the display interface may include any combination of cell sites that are presently, previously, or potentially connecting the mobile communication device 102 to the radio access network. The virtual map may display a subset of a plurality of base transceiver stations 112 relative to the geolocation of the mobile communication device 102. To present specific base transceiver stations 112 on a virtual map, an application may reference the geolocation, network identifier 109, history of wireless communication and/or other information of the mobile communication device 102 to identify the connecting and/or relevant base transceiver stations 112. An example of determining a subset of base transceiver stations 112 may include comparing the known geolocations of relevant base transceiver stations 112 with the geolocation of the mobile communication device 102. A predefined distance from the mobile communication device 102—such as a two mile radius set by a communication service provider—may direct an application to present the base transceiver stations 112 within a two mile radius of the mobile communication device's 102 geolocation. This may be advantageous because it may minimize confusion in selecting the base transceiver station 112 that is relevant to the user providing feedback. Upon selection of a presented base transceiver station 112, a user may input a satisfaction metric that is received by an application. The input of one satisfaction metric may be associated with at least one of the presented subset of base transceiver stations 112. Alternatively, a feedback application 106, 130, 142 may associate the satisfaction metric with a component of the radio access network not presented on a virtual map.

In an embodiment, only authorized users may access a map view displayable on an interface. A feedback application 106, 130, 142 may receive credentials for verification and authorization of access to the virtual map from a user. Upon verification, the virtual map view allows and/or enables features such as selection of cell sites, display of metrics and/or feedback information about the cell sites or sectors. A list of authorized personnel may be maintained on a storage accessible via the network 120. This list may be accessible to applications for verification of credentials to ensure that a user and/or application requesting the map view feature is authorized for access. In an embodiment, authorized personnel associated with a communication service provider may view a virtual map that displays user inputted satisfaction metrics associated with each base transceiver station 112 along with other metrics and network information pertaining to the base transceiver station 112. For example, a technician employed by a communication service provider to work on the radio access network may be considered an authorized user who may access a map view of base transceiver stations 112 on a display to review and/or input satisfaction metrics associated with a selected base transceiver station 112.

The feedback data store 150 may comprise data and/or information relating to user feedback about the user's experience with the operations of the radio access network. In an embodiment, the feedback data store 150 may comprise a plurality of messages that each contain information and/or metrics about the level of satisfaction a user experiences in perceived communication quality using a mobile communication device 102. A metric may be based on an input by a user of the mobile communication device 102, wherein the user of the mobile communication device 102 utilizes a component of the radio access network, such as a base transceiver station 112. In an embodiment, a metric may be referred to as a satisfaction metric when the metric is associated with and/or based on a level of satisfaction regarding the user's perception of a communication quality between the radio access network 120 and the corresponding mobile communication device 102. For example, a user of a smartphone may desire to send a data communication, such as a text message or a picture message, via the radio access network; however, completed transmission of the data communication is perceived by the user to take an unusually long time, meaning a time deemed unacceptable by the user. The user may utilize a satisfaction metric to convey dissatisfaction as the user's perception of communication quality that relates to their experience of the communication with the radio access network.

In an embodiment, the satisfaction metric is a coarse grained metric. A course grained satisfaction metric may comprise one of a plurality of discrete options that may correspond to a plurality of visual representations displayable and selectable on an interface, such as the display of a mobile communication device 102. In some embodiments, the plurality of discrete options may comprise not more than fifty, twenty, ten, five, or two discrete options. Some embodiments of a discrete option include any of icons, text, or numbers that are predefined by a communication service provider to correlate with a level of satisfaction. A feedback application 106, 130, 142 may be configured to receive an input from a user that corresponds with one of the presented discrete options. This may allow a user to identify the appropriate discrete option that corresponds with the user's level of satisfaction of perceived communication quality of a mobile communication device 102 that is interacting with the radio access network. For example, but without limitation, a satisfaction metric that is coarse grained may comprise a thumbs up icon indicating that the user is satisfied, and a thumbs down icon indicating the user is not satisfied. Alternative visual representations of discrete options may include a plurality of star icons. For example, one star and five stars may be two discrete options as a satisfaction metric that is receivable by a feedback application 106, 130, 142. The feedback application 106, 130, 142 may be configured to interpret the satisfaction metric of one star as dissatisfied and five stars as satisfied. Similar alternatives for discrete options of a satisfaction metric that is coarse grained may include happy and/or sad face icons, check marks, or short text phrases such as "dissatisfied", "average", and "satisfied". It is understood that selection of visual representations or input of text that is received by a feedback application 106, 130, 142 as a satisfaction metric correspond with predefined definitions for levels of satisfaction that may be converted or transformed into a computer-readable form for processing by a computer.

In an embodiment, a satisfaction metric associated with communication quality between the radio access network and a user's mobile communication device is subjective in nature and relative to the user's perception of effective operation of a corresponding mobile communication device 102 with the service of a communication service provider. In an embodiment, communication quality is understood to be based on the perception of a user of a mobile communication device 102 and the use of that mobile communication device 102 via the radio access network. While technical factors of a communication transmission via the radio access network may be attributed to the quality of communication services provided by a communication service provider associated with the network, a satisfaction metric input by a user of a mobile communication device may be based on the subjective perception of the user. For example, perceived communication quality may relate to breadth of cellular coverage within the radio access network, time associated with data transmission, or level of signal strength associated with a wireless network protocol promoted by base transceiver stations 112.

A user of the mobile communication device 102 may input feedback information using an application, SMS, and/or voice communication. For example, a smartphone user may input a satisfaction metric using a feedback mobile application 106 executing on a mobile communication device 102 to capture the satisfaction metric. Alternatively, a user of the mobile communication device 102 may access a web interface provided by a component of the network 120 and accessed from computers 380. Web browsers executing on any of workstations, desktop computers, laptop computers, tablet computers, and the like, may navigate to a feedback web application 130 interface to input a satisfaction metric that is captured by the feedback web application 130. In an embodiment, storages 150, 152, 154, 156, 158 may receive information and/or data from a feedback mobile application 106 and/or feedback web application 130.

The communication system 100 includes a network server 140 that is configured to run applications, such as a feedback network application 142. It is understood that a network server 140 may comprise a plurality of computer systems communicatively coupled to the network 120 and are described in greater detail hereinafter. A feedback network application 142 may comprise software that is configured to receive and analyze information related to user feedback about the user's perception of communication quality between the network 120 and the user's mobile communication device 102. The feedback network application 142 may extract and/or analyze information from messages sent by other sources, such as a feedback mobile application 106, feedback web application 130, SMS, or content from a customer care call. The feedback network application 142 may be configured to analyze information from messages that includes, but not limited to, the geolocation of a mobile communication device 102, a user identification, a mobile communication device identification, a user complaint, network identification, contextual description of geographic environment, types of communication, and weighting of a user's complaint and/or praise related to the user feedback, such as in the form of a satisfaction metric. Initiation to generate messages may occur from a user of a mobile communication device 102, a feedback application 106, 130, 142, or by a component of the network 120 prompting a mobile communication device 102 user to initiate feedback.

The feedback network application 142 may be employed to analyze and visualize user feedback about communication quality of a network 120 at a variety of different levels of granularity. The feedback network application 142 analysis may depend upon or invoke information provided by a storage, such as a status data store 152, to determine whether further analysis relating to the messages is warranted. For example, a plurality of messages may be analyzed to show that a majority of messages comprising complaints about satisfaction with user perceived communication quality share a common characteristic, such as the same mobile device manufacturer.

A feedback network application 142 may identify a geolocation of each mobile communication device 102 that is associated with each message. Determination of a mobile communication device's 102 geolocation may be identified using components of the network 120 to coordinate a position. It is understood that identification of a geolocation is not to be limited to information obtained from a global positioning system, but may be calculated via methods such as trilateration, multilateration, user input, Hypertext Markup Language (HTML5), or calculated or inferred from other data sources. One skilled in the art will recognize that HTML5 enables geolocation API functionality. Alternatively, a feedback network application 142 may identify a geolocation that was previously determined by a mobile communication device 102 and associated with a message sent by an application, such as a feedback mobile application 106 and/or a feedback web application 130. In an embodiment, a geolocation associated with a message from a feedback application 106, 130 relates to the location where a user of a mobile communication device 102 bases feedback information, such as a satisfaction metric. A geolocation may have varying degrees of granularity, for example a location based on city, postal code, street intersections, address, relative distance from nearby cell sites, or geocoordinates.

The feedback network application 142 may be employed to identify a base transceiver station 112 associated with each message from a mobile communication device 102 by utilizing components of the network 120. In an embodiment, the identification of a base transceiver station 112 may be determined by referencing the geolocation of the mobile communication device 102. The identification of particular base transceiver stations 112 may assist with maintaining the operational integrity of the network 120 by drilling down on potential problems before they develop further. After a base transceiver station 112 is identified and associated with the message from the mobile communication device 102, a feedback network application 142 may receive a metric to compare known information about base transceiver stations 112 with the information provided from a feedback application 106, 130. Metrics may be associated with the status data store 152—that is any of trouble ticket metrics, network upgrade metrics, or performance metrics. In an embodiment, metrics pertaining to the feedback information from the feedback data store 150 may be received and used in identifying a base transceiver station 112.

In an embodiment, a feedback application 106, 130, 142 may present a display of current cell sites and/or base transceiver stations 112 shown within a predefined distance of the identified geolocation of each mobile communication device 102. For example, locations of cell sites and/or base transceiver stations 112 may be overlaid on top of a map that may be presented on a display of a computer or mobile communication device 102. In one embodiment, individual cell sites and/or base transceiver stations 112 may be selected and a satisfaction metric may be applied. For example, a user may use a smartphone having a touchscreen to view the map overlaid with locations of base transceiver stations 112. The user is able to select (i.e., input on a display) or click on a base transceiver station 112 (i.e., a predefined approximation of a BTS geolocation) displayed on the map for rating by giving a satisfaction metric, such as a thumbs up or thumbs down icon, in order to indicate, for example, the current level of performance of communication quality that is perceived by the user.

In one embodiment, after inputting and/or receiving a satisfaction metric of a selected base transceiver station, a network communication test—discussed below—may automatically and/or asynchronously engage and/or initiate via the network 120 in order to gain additional communication information about the current state of connectivity between the network 120 and the mobile communication device 102 being tested. In some embodiments, the network communication test is conducted in the background operations of the mobile communication device 102 so that a user may continue use of the mobile communication device 102.

By way of example, a network communication test (also occasionally referred to as a communication test) may comprise any of an evaluation and/or identification of various communicative functions between any of a device (e.g., mobile communication device 102), a network 120, a radio access network, and/or components therein. In some embodiments, a network communication test may include, for example, any of a bandwidth test, ping test, telecommunication test of voice, data, and/or video calls, varied wireless protocol testing, communication signal strength and/or stability tests, health of a mobile communication device 102, and/or frequency of use in predefined geographic location. A bandwidth test may be sometimes referred to as a speed test which measures consumed data communication resources in bits per second of a network or communication channel, such as testing for maximum network throughput in Mbit/s. A ping test may include determining whether a particular network host is reachable across a network and/or the latency of the tested communication. Telecommunications tests of voice, data, and/or video calls may include test calls designed to mimic actual user calls across a network, that may include known feature-rich call options offered by a communication service provider, such as three-way calling, caller identification, and/or other known features. Varied wireless protocol testing may include any of the above communication testing over different wireless protocols, such as testing data communication over 3G and comparing against data communication over LTE. Communication testing of the health of a mobile communication device may include, for example, analyzing mobile device battery statistics and/or determining versions of device hardware and/or software. Communication testing may include determining the frequency (i.e., number of times) a mobile communication device 102 uses the wireless services in a predefined geographic location and/or testing a mobile communication device 102 based on the mobile device entering the predefined location. In some embodiments where a user has no wireless service, a request for a network communication test may be enqueued to perform a test at the next available opportunity, at a predefined time, and/or at the discretion of the communication service provider.

Additionally, network communication testing may be the basis for a communication service provider (or executing application thereof) to generate metrics, and/or provide a response to address an issue. For example, results from a communication test may comprise technical information that may be used to form a connectivity metric for quantifying and/or determining whether a problem or issue exists. In some embodiments, a response may include a request for detailed information, giving a recommendation for a course of action, and/or taking an action.

For example, a mobile communication device user may enter a supermarket and subsequently discover that he or she has no wireless service coverage. The user may input feedback including a negative satisfaction metric into an application to signify displeasure, and a message is sent when the mobile device regains wireless service. A network communication test may confirm that the wireless service is weak and/or not covered at or near the identified geolocation of the corresponding feedback. An application of the network provider may recommend a mitigating solution for the weak or lack of service coverage, such as sending out a service technician and/or installation of a remediation device like a femtocell. Alternatively, the network communication test may reveal that the mobile device has an outdated software version that is likely causing the problem, and may recommend that the user upgrade the software to mitigate the issue.

Another example may include a mobile device user consistently engaging in a data call while traveling on a section of highway at the same time of day. However the data call connection repeatedly drops at the same general geolocation on the highway, thus prompting the user to give feedback including a negative satisfaction metric. A network communication test may be initiated and reveal that the wireless protocol strength used near the corresponding geolocation was low and that an alternative wireless protocol may be more suitable due to a higher signal strength and less likelihood of dropping the connection. To determine whether a dropped call is a frequent occurrence that may lead to additional negative feedback, an application may automatically trigger (or enqueue) a network communication test to occur the next time the user's mobile communication device passes within a predefined distance of the geolocation corresponding to the identified problematic geolocation. The network communication provider may confirm the results of the previous communication test (i.e., low signal strength) and may take action by automatically switching a user's mobile device (or all mobile devices of the network in the area) to use a different wireless protocol while that user's mobile device is within a predefined range of the identified problematic geolocation area. In some embodiments, the network communication provider may automatically switch the user's mobile communication device (or all mobile devices that were changed) back to the previous wireless protocol after leaving the predefined area. In an embodiment, the network communication provider may automatically switch the wireless protocol in use by accessing API's of the mobile communication device and/or controlling components of the network 120.

In some embodiments, the feedback information of the satisfaction metric and results from at least one network communication test may be included in a message sent to a network administrator. Alternatively, a network communication test may occur at the discretion of a communication provider, such as based on a trigger event or after a message is sent by the feedback applications 106, 130. A follow-up communication request—such as an email to the user of the mobile device giving the satisfaction metric—may be generated and transmitted when an event has been triggered, such as a correlation reaching and/or passing a predefined threshold. For example, a feedback application 106, 130, 142 receiving a satisfaction metric and/or identifying a correlation between metrics and feedback information contained in messages may trigger a communication test of a mobile communication device and/or request more feedback from a particular user associated with the identified correlation. Sending a request for detailed feedback (i.e., not primarily focused on coarse-grained feedback) may allow the user to fill in and/or provide a detailed explanation when they are using a different device such as their home computer and have the convenience of typing in a detailed response. Alternatively, a user may receive a phone call or SMS text message requesting if the user would like to give further feedback.

In an embodiment, a feedback network application 142 may aggregate a plurality of messages that share a similar characteristic with at least one of the metrics from the status data store 152, as previously disclosed, and/or with metrics about feedback information that is stored in the feedback data store 150. The feedback network application 142 may aggregate the messages with metrics corresponding to an identified base transceiver station 112 that has been associated with the message. For instance, an application 142 receives performance metrics and trouble ticket metrics from a status data store 152, where both sets of metrics relate to an identified plurality of base transceiver stations 112, and the application aggregates messages and/or components of the messages associated with different mobile communication devices 102 to be analyzed with the received metrics relating to identified base transceiver stations 112.

After receiving metrics from a status data store 152 and/or a feedback data store 150, an application—such as the feedback network application 142—analyzes at least a subset of the plurality of messages with at least one of the metrics from a storage 150, 152. Some embodiments of analysis determine whether a correlation exists between at least a subset of the plurality of messages and at least one of the corresponding metrics associated with at least one base transceiver station 112. For example, the feedback network application 142 may analyze whether an identified base transceiver station 112 associated with a mobile communication device 102 has a percentage of both trouble tickets and negative feedback information—such as negative satisfaction metrics—associated with it despite having been recently upgraded to enhance functionality and service of the network 120. A predefined threshold may be configured in the analysis of the feedback network application 142 to detect whether a correlation is present between the information being analyzed. In an embodiment, if a correlation is determined to exist, the network feedback application 142 may automatically transmit a notification to a communication service provider associated with the radio access network that identifies the existing correlation. A notification transmitted to a provider may occur in a variety of manners, such as—but not limited to—transmitting an alert to a data store that stores information pertaining to the base transceiver station 112 at issue. Alternatively, a notification transmitted to a communication service provider may occur by implementing a digital flag, comment, trouble ticket, or prompt on an application that monitors the operational integrity of components of the network 120, such as base transceiver stations 112. Determination that a correlation exceeds a predefined threshold, and thus exists, may prompt an application to automatically conduct and/or initiate further analysis and/or perform actions to address potential problems with the functionality of an associated base transceiver, and/or whether the continued monitoring of the correlation is in order. An example of performing actions may include automatically engaging and/or initiating at least one mobile communication device 102 in a network communication test (as described above). Initiation of a network communication test may occur with a mobile communication device 102 that did not participate in giving feedback. Yet in some embodiments, the device being tested may be due to sharing a common characteristic and/or attribute with a particular mobile device which gave feedback and/or because of an identified existing correlation from feedback information. Examples of common attributes may include any of a manufacturer, developer (e.g., hardware and/or software and application versions thereof), predefined geographic location (e.g., a geolocation that has been previously identified has having problematic network conditions), a time of day, a customer account (i.e., mobile devices within the account of a user held by the communication service provider), and/or a planned event (e.g., after a metric exceeds a predefined threshold, occurrence of a sporting event, or when prompted by the communication service provider).

In an embodiment, following the generation of feedback information—such as a satisfaction metric, mobile communication device identifier 108, and network identifier 109—a feedback application 106, 130, 142 may prompt a user with an opportunity to provide a detailed response in order to elaborate about the problem and/or praise they are experiencing with the radio access network. Because the user may not have the time or desire to provide a detailed explanation for the satisfaction metric at the time of giving the metric, an alternate channel of communication allows the user to explain contextual information and/or their reasoning for giving the satisfaction metric. The communication service provider of the radio access network thus has an opportunity to better understand the nature of the user's satisfaction metric. An application, such as a feedback application 106, 130, 142, may identify the user providing feedback and send that user any of a request, email, survey, link to a web portal, and/or other follow-up communication that allows the user an opportunity to provide a detailed description, which may be related to the user feedback information—including the satisfaction metric and corresponding messages. For example, a user would have the opportunity to provide contextual information about the problem, such as a description of the geographic environment where the satisfaction metric corresponds, location of where the problem is experienced, type of device 102, whether the user is indoors or outdoors, type of communication, and/or who uses the device. Examples of describing the geographic environment where the satisfaction metric corresponds may include any of a vehicle, building, transit facility, sporting facility, public space, or thoroughfare. In an embodiment, a feedback application 106, 130, 142 may transmit and/or provide the user associated with a message from the feedback data store 150 with a request and/or inquiry to provide and/or select from predefined descriptions about the corresponding message from the feedback data store 150. In an embodiment, the feedback application 106, 130, 142 utilizes the communication device identifier 108 that is associated with a user of the radio access network in the determination of where a request is sent. For example, a mobile communication device 102 user may prefer to write a more thorough description relating to their feedback information while on a platform more conducive to elaboration, such as a desktop computer, to provide and/or key in a detailed description. To minimize user effort, the feedback application 106, 130, 142 may reference the communication device identifier 108 in determining an appropriate contact medium, which may then be used for requesting detailed feedback (e.g., using the device identifier 108 to lookup and/or cross reference with a stored user account that has known email addresses or telephone numbers as a preferred means of communication).

Figure 2:
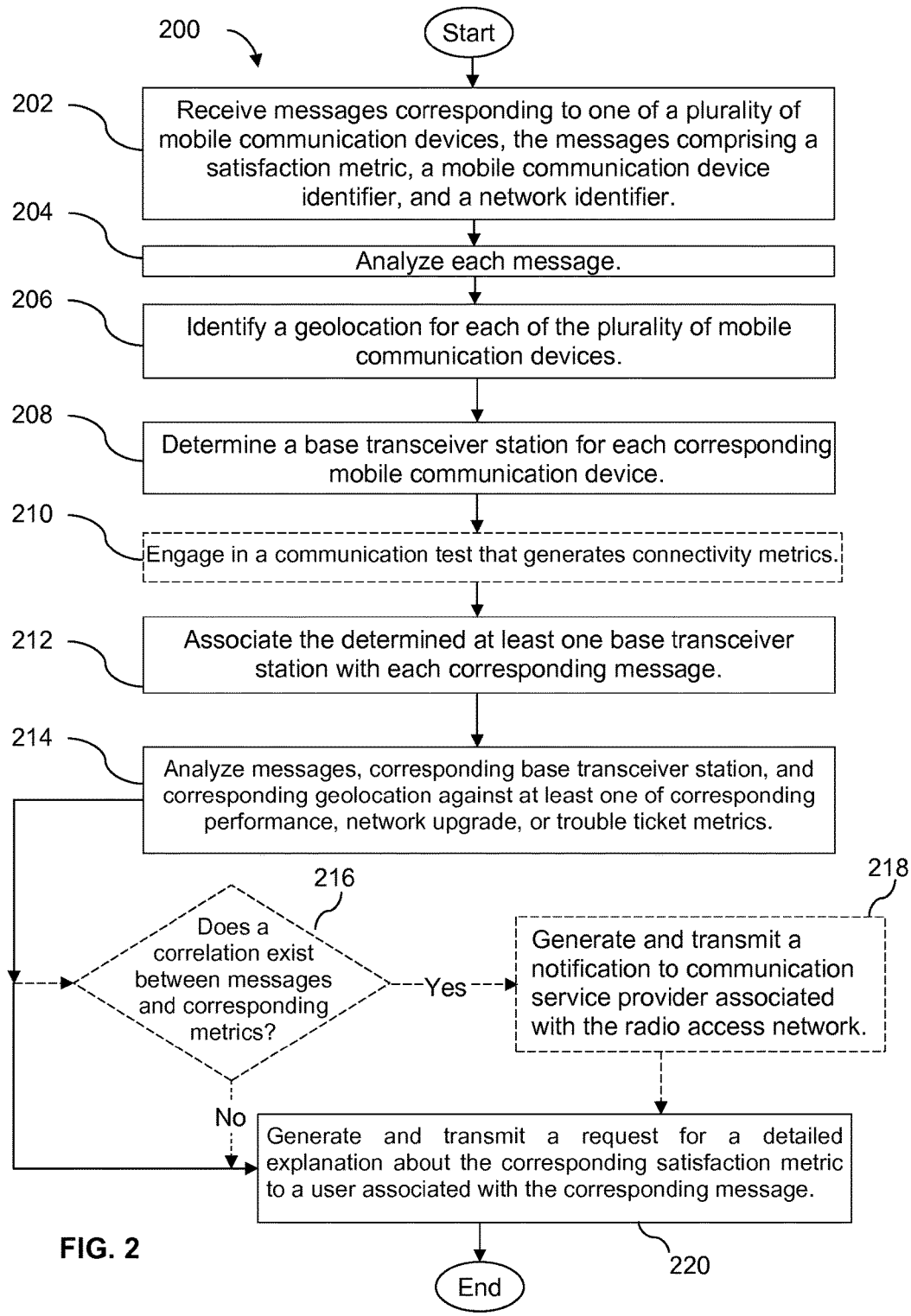
FIG. 2 is a flow chart illustrating a method according to an embodiment of the disclosure.

Turning now to FIG. 2, a flowchart illustrating a method 200 of evaluating operational integrity of a radio access network is disclosed according to one embodiment. Initially, a component coupled to the network 120, such as a network server 140, receives 202 a plurality of messages corresponding to one of a plurality of mobile communication devices 102. The messages received may be of several different types, for example, messages generated by a feedback application 106, 130, 142, messages using SMS, or messages input by a communication service provider during a customer care call. It is understood that analysis of information performed on a network server 140 may occur by using an application, such as a feedback network application 142. In an embodiment, a message may be received from a storage, such as a feedback data store 150.

Each message may comprise feedback information, such as any of a mobile communication device identifier 108, a network connection identifier 109, geolocation of the mobile communication device 102, history of wireless communication, textual description of a geographical environment, and/or a satisfaction metric. In an embodiment, the satisfaction metric is input by a user and is associated with the user's perception of a communication quality between the radio access network and a corresponding mobile communication device 102. In some embodiments, the satisfaction metric is a coarse grained metric that comprises one of a plurality of discrete options. The satisfaction metric may be configured to associate with a type of communication, such as voice communication and/or data communication. In an embodiment, a feedback application 106, 130, 142 may allow a user to input a textual description of the geographic environment of the corresponding mobile communication device and/or select a predefined textual description of the geographic environment. The textual description of a geographic environment of a corresponding mobile communication device 102 may comprise a description of the current environment that surrounds the mobile communication device 102 and may be a factor in the input of the satisfaction metric. Examples of a description of the geographic environment of the mobile communication device 102 include, but are not limited to, the device is in and/or near any of indoors, outdoors, a vehicle, a building, a transit facility, a sports facility, a public space, or a thoroughfare.

At block 204, once received, messages are analyzed by an application that may execute on a server, such as network server 140. The messages may be associated with each of the plurality of mobile communication devices 102 to which the feedback information of the messages pertain. This may be advantageous because it allows for separation of the messages into groups of messages that process related data, so that messages that are likely to share a characteristic, such as the same device manufacturer or location of problem experienced, can be identified. In an embodiment, the message analysis may determine whether a subset of a plurality of messages has shared characteristics which may be designated by a communication service provider. For example, a network server 140 may analyze a plurality of messages and identify that a particular wireless communication protocol is receiving a more negative satisfaction metric rating than other wireless protocols. Alternatively, further analysis of messages may continue regardless of identification of shared characteristics.

In an embodiment, at block 206, a network server 140 identifies a geolocation of each of the plurality of mobile communication devices. The identification of geolocation may be based on analysis of each message or a plurality of messages. The geolocation of the mobile communication device 102 is used to identify where a user is located within the network 120 in order to further determine, for example, strong and/or weak areas of operational integrity of the network. In some embodiments, identifying the geolocation of a mobile communication device 102 may occur using methods previously disclosed. For example, the network server 140 may use components of the network 120 and/or radio access network to determine a geolocation of the mobile communication device 102, which may then be referenced and/or provided in the message. Alternatively, analysis of the messages may provide adequate information to determine the geolocation of the mobile communication device 102.

At block 208, a network server 140 may determine at least one base transceiver station 112 is associated with each of the mobile communication devices 102. The determination may be responsive to identifying the geolocation of each of the plurality of mobile communication devices 102 associated with each message. This may be advantageous because it allows for further clarity of which base transceiver stations 112 and/or cell sites each mobile communication device 102 is or was communicatively coupled with thereby allowing contextual feedback information relating to each of the messages associated with the mobile communication device 102. In an embodiment, determination of corresponding base transceiver stations 112 may occur by referencing the geolocation of the mobile communication device 102. Components of the network 120 may be used to determine base transceiver stations 112 and such identification may be associated with the corresponding messages and stored with and/or in the messages for retrieval at a future time from a storage, such as from a feedback data store 150. After determining the base transceiver station 112, associations may be made with the corresponding messages and feedback information, such as a mobile communication device identifier 108 or network identifier 109.

In some embodiments, at block 210, a component, such as a server associated with the radio access network and/or communication service provider, engages in a network communication test via the radio access network with at least one mobile communication device 102 that may correspond to a message. The engagement of a network communication test may be dependent and/or based on prior events, such as any of message analysis and identification of at least one base transceiver station 112, or determination of an existing correlation that may exceed a predefined threshold. In some embodiments, a network communication test may engage automatically and/or asynchronously by an application, such as a feedback application 106, 130, 142. The network communications test may generate connectivity metrics that are associated with a corresponding message about a mobile communication device 102. A network communications test may include obtaining diagnostic information about a mobile communication device's 102 communicative coupling to the network 120. For example, a network communication test may comprise performance of a speed test of the wireless communication protocol that communicatively couples the mobile communication device 102 to the radio access network. The network communication test may be performed in a separate, concurrent step of a feedback application 106, 130, 142, or may execute in the background of a mobile communication device 102. The network communication test may be initiated by an application, such as any one of a feedback application 106, 130, 142, a third party application, or by a component of the network 120.

In some embodiments, a network communication test may generate a connectivity metric. Connectivity metrics generated from a network communications test may include varying degrees of complexity that may comprise technical information about the current state of communication with the radio access network. For example, a connectivity metric may include results related to the speed of wireless protocol communication transmission, information related to ping, hop count, software and/or firmware diagnostics, wireless signal strength, or the like. This information may be bundled and/or associated with the corresponding messages and mobile communication device 102. In some embodiments, after engaging in a network communications test, the network server 140 may tag, associate, and/or incorporate the messages with the connectivity metrics to ensure that any analysis of the messages accounts for the generated connectivity metrics associated with the corresponding messages. In an embodiment, the messages are updated to include the generated connectivity metrics. For example, after performance of a network communications test, a feedback application 106, 130, 142 may incorporate the results from the test, such as the generated connectivity metrics, into a preexisting and/or new message that may be transmitted to the communication service provider and/or a storage for asynchronous analysis.

In an embodiment, at block 212, a feedback application (such as any of 106, 130, 142) may associate the determined at least one base transceiver station 112 with a corresponding message. The network server 140 may also determine metrics that are associated with the corresponding base transceiver stations 112. The metrics may be preexisting and stored in a storage, such as a status data store 152, feedback data store 150, trouble ticket data store 154, upgrade data store 156, and/or performance data store 158. The metrics may be associated with the messages and may comprise any of feedback metrics, status metrics, trouble ticket metrics, network upgrade metrics, and/or performance metrics.

At block 214, the network server 140 may analyze a variety of information (including any of feedback information from the messages, the corresponding base transceiver station 112, or the corresponding identified geolocations) with metrics that are associated with the corresponding base transceiver station 112 identified from the corresponding messages (including any of connectivity metrics, feedback metrics, performance metrics, network upgrade metrics, and/or trouble ticket metrics).

In one embodiment, at block 216, the analysis of messages with metrics may require a determination of whether a correlation exists between a subset of the messages and at least one of the corresponding metrics associated with the base transceiver station 112. An existing correlation may comprise a variety of relationships between analyzed information and such correlations may be determined by identifying relationships between analyzed information that exceeds a predefined threshold. For example, if a feedback network application 142 analyzes messages generated from a feedback mobile application 106 against metrics related to performance and network upgrades about the identified base transceiver station 112, it may be determined that a correlation exists following the execution of network upgrades to the base transceiver station 112 because the frequency of negative satisfaction metrics increased while the frequency of connectivity metrics and performance metrics decreased. A predefined threshold may be set by a communication service provider such that analysis of sets of information, such as satisfaction metrics and performance metrics, identifies quantifiable relationships. For example, forty percent of performance metrics may show forty percent average dropped call frequency associated with a particular base transceiver station 112 also has seventy percent negative satisfaction metrics. A communication service provider may set a predefined threshold as twenty percent dropped call frequency and fifty percent negative satisfaction metrics, where both correspond to the particular base transceiver station 112. Because the example exceeds the predefined threshold, an application would consider a correlation to exist. Determination of a correlation exceeding a predefined threshold, and thus existing, may prompt an application to take an action or perform a function, such as generating and sending a notification, and/or engaging in a network communication test.

In an embodiment, at block 218, upon identification of an correlation exceeding a predefined threshold, (between messages, base transceiver stations, and/or corresponding metrics) the network server 140 may generate and/or transmits a notification to communication service provider associated with the radio access network. For example, the notification may comprise an identification of any of the determined correlation, the messages demonstrating the correlation, the corresponding base transceiver stations 112, the geolocation of corresponding mobile communication devices 102 and/or the associated metrics. As previously mentioned in FIG. 1, a notification transmitted to an communication service provider may occur in a variety of manners, such as—but not limited to—transmitting an alert to a data store that stores information pertaining to the base transceiver station 112 at issue. Alternatively, a notification may implement a digital flag, comment, trouble ticket, or prompt on an application that monitors the operational integrity of components of the radio access network, such as operation of base transceiver stations 112. The notification may allow for further analysis to determine whether action needs to be taken about the functionality of the associated base transceiver station 112, and/or whether the continued monitoring of the correlation is in order.

In an embodiment, a feedback application 106, 130, 142 may supplement an analysis of an identified geolocation with an association of a description of a geographic environment of the mobile communication device. Examples of a description include at a sports stadium, inside a car, inside a building, or the like. This may be helpful when analyzing information associated with the geolocation. For example, a component of the network 120 may access a storage comprising information about public event schedules, and indicate that a professional football game was played between noon and 3 PM on a particular Sunday. Analysis by a feedback application 106, 130, 142 may use this information to vary the exclusion or inclusion of metrics associated with a cell site close to the football stadium between 8 AM and 6 PM from calculations of related to the identification of any correlations. In an embodiment, a schedule data store may contain information on public events such as professional sports events, college sports events, graduation ceremonies, public fireworks displays, as well as other public events.

In an embodiment, analysis may reveal that a public event is currently underway. A feedback application 106, 130, 142 may attempt to solicit feedback information for the user of a mobile device using the network at a public event. For example, an application or network server may push a request to receive feedback information—such as a satisfaction metric—about a mobile communication device 102 that is identified to be at a geolocation proximate to the location of the identified public event. The application or network server may request input of a satisfaction metric using, for example, a feedback application 106, 130, a pop-up notification, or SMS test requesting feedback about a user's perception of communication quality between the network 120 and a mobile communication device 102 while proximate to the public event.

In an embodiment, a feedback application 106, 130, 142 generates a request to a user of the corresponding mobile communication device 102 for a detailed explanation of the feedback information associated with the message pertaining to a mobile communication device 102. A request for a detailed explanation may comprise of a follow-up communication sent to the user associated with the message after input of a satisfaction metric. For example, a network server may utilize the mobile communication device identifier 108 to determine the user or account associated with the mobile communication device 102 that uses the network 120, then determine contact information from a storage containing information about the user of the mobile communication device 102. Alternatively, the user may provide the contact information for requesting a detailed explanation, such as an email address and/or contact by SMS or voice call. This is advantageous because it enables a user to initially provide simple feedback using a feedback application 106, 130, 142, and then follow up by giving contextual information, thereby allowing a more thorough description while on a better platform, such as a computer.

At block 220, the request for a detailed explanation may be transmitted to the user of the radio access network 120 who is associated with the mobile communication device identifier 108. For example, the transmitted request may comprise sending an email, SMS, phone call from a customer care center, and/or a pop-up notification request from a feedback application 106, 130, and/or 142.

Figure 3:
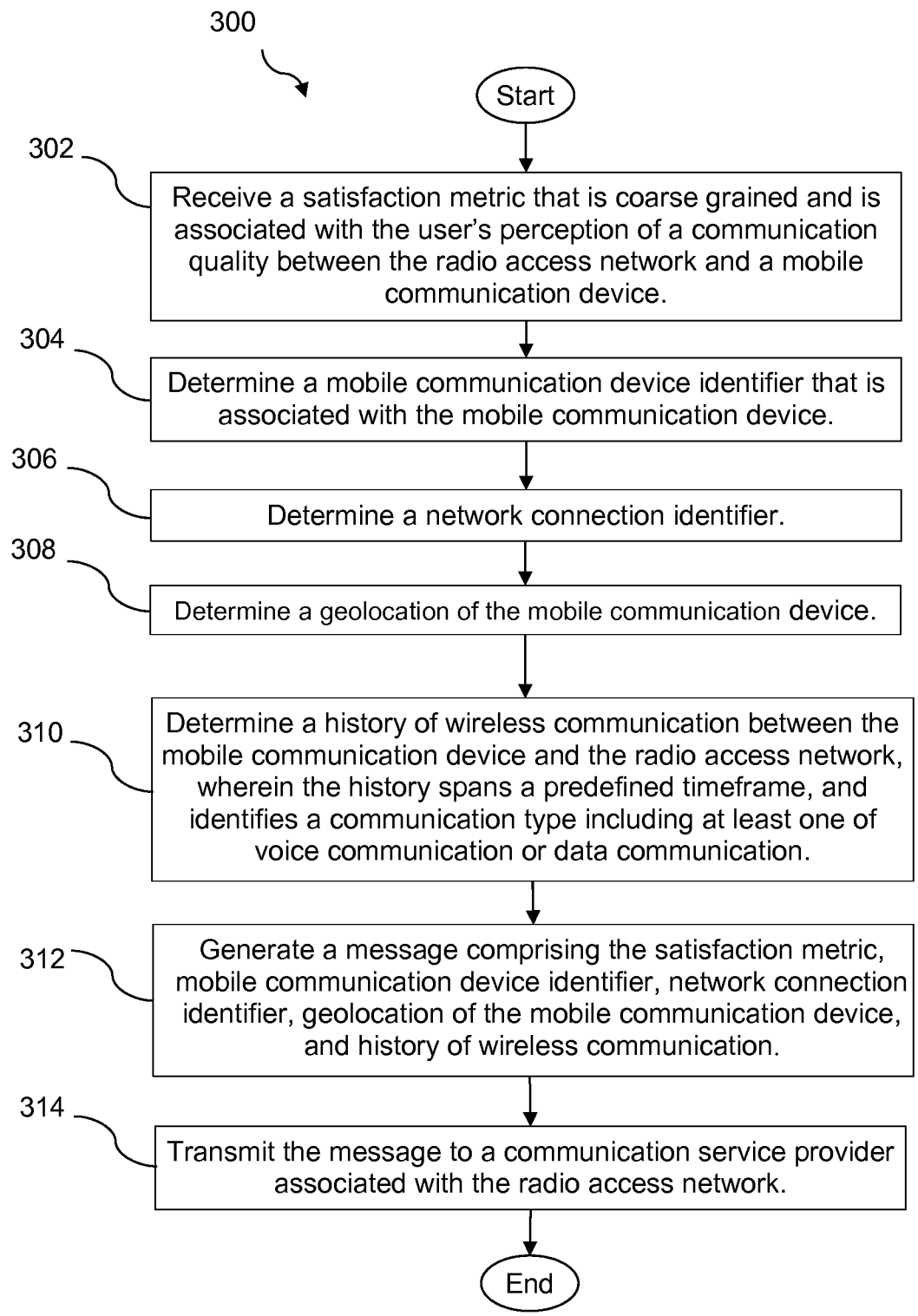
FIG. 3 is a flow chart illustrating another method according to an embodiment of the disclosure.

Turning now to FIG. 3, a flowchart illustrating a method 300 of evaluating operational integrity of a radio access network 120 is disclosed according to one embodiment. The method 300 operates in a system in which mobile communication device 102 is used to operate via a network 120 by communicatively coupling a mobile communication device 102 to the radio access network using components such as base transceiver stations 112. In the depicted embodiment, the radio access network allows operation of mobile communication device 102 and thus operational integrity of the radio access network benefits from ongoing maintenance and evaluation. Evaluation of operational integrity may include using a computer that comprises network connectivity devices, such as a transceiver, modem, radio transceiver, or the like, to communicatively couple the computer to a radio access network. As described below herein, a computer may comprise a processor, a memory, and an application. In some embodiments, a computer may take the form of a mobile communication device 102. In an embodiment, a feedback mobile application 106 executes on a processor of a mobile communication device 102 thereby facilitating the method 300. Alternatively, the method 300 may be employed using a feedback web application 130 that is accessible on a web interface by a computer 380 and/or mobile communication device 102 where communication with the network 120 is achievable, such as a connection to the Internet. In an embodiment, a feedback web application 300 may communicate with the network 120 without relying on the communicative functionality of a mobile communication device 102. For example, a mobile communication device 102 may not have sufficient battery charge to operate or is out of range to receive wireless communication protocols from the network 120. Use of a computer 380 may allow a user an opportunity to engage in the method 300 via the feedback web application 130 without executing the feedback mobile application 106 on a mobile communication device 102.

At block 302, the method 300 begins by receiving a satisfaction metric from a user input, wherein the satisfaction metric is associated with the user's perception of a communication quality between the radio access network and a mobile communication device 102. Embodiments of the satisfaction metric and communication quality are previously described. A feedback application 106, 130, 142 and/or a communication from a network 120 may prompt a user to give a satisfaction metric, such as a satisfaction metric that is a coarse grained metric. For example, a communication from a network 120 may comprise a user receiving an SMS prompt to input a satisfaction metric, wherein the user chooses from a list of discrete objects, such as a thumbs up icon, thumbs down icon, a plurality of stars, or the like. A user is prompted to give a satisfaction metric based on the user's perception of how well a mobile communication device 102 operates via the radio access network. This user perceived communication quality between the radio access network and a mobile communication device 102 may associate with and/or be basis of the satisfaction metric, including the level of that rating and/or ranking.

At block 304, a feedback application 106, 130, 142 may determine a mobile communication device identifier 108 that is associated with the mobile communication device 102. Embodiments of the mobile communication device identifier 108 are described according to FIG. 1. Additionally, at block 306, an application determines a network connection identifier 109. Embodiments of the network connection identifier 109 are described according to FIG. 1.

In some embodiments, at block 308, the method 300 may determine a geolocation of the mobile communication device 102. The determination of a geolocation of the mobile communication device 102 may be performed by an application executing on the mobile device 102, such as a feedback mobile application 106, and/or in conjunction with other applications, such as communication application 110. In an embodiment, components of the network 120 may be utilized to determine the geolocation of the mobile communication device 102.

In an embodiment, at block 310, a feedback application 106, 130, 142 determines a history of network communication between the mobile communication device 102 and the network 120, wherein the history of network communication spans a predefined timeframe. The history of network communication may be determined by one application, such as feedback application 106, 130, 142, referencing other applications having access to the history of wireless communication. In some embodiments, a feedback application 106, 130, 142 may refer to communication logs from communication applications 110 and/or logs that may be stored on a storage of the communication service provider and accessed via the network 120. The history of network communication may also identify a communication type including at least one of voice communication and/or data communication. It is understood that history of wireless communication refers to a history of network communication involving wireless communicative coupling.

In an embodiment, a predefined timeframe of network communication history for a mobile communication device 102 may comprise a set amount of time that may be defined in, for example, hours, days, and/or billing cycles. For example, a history of network communication may include references to activity logs, communication logs, call logs, and/or other activity related to the usage of wireless communication with a mobile communication device 102 on the network 120. In an embodiment, a history of network communication spanning a predefined timeframe may be referenced relative the time a feedback application 106, 130, 142 is used and/or by the type of communication utilized. In an embodiment, a communication service provider may set, define, and/or determine the predefined timeframe. For example, if a feedback mobile application 106 is used to provide feedback information, such as a mobile device identifier 108, satisfaction metric, and the like, to a communication service provider, it may be advantageous for the provider to know the type and frequency of usage of the corresponding mobile communication device 102 leading up to the time a message from the feedback mobile application 106 is transmitted. By way of example, a time around the transmission may include, but is not limited to, determining wireless data communication via the network 120 over the past few billing cycles or within the past week. Information and/or data pertaining to the history of network communication may be associated with the message from a feedback application 106, 130, 142 and may be transmitted via a network 120 concurrently with a message and/or included in the message from a feedback application 106, 130, 142.

At block 312, an application may also perform the step of generating a message that may comprise any of the satisfaction metric, a mobile communication device identifier 108, a network connection identifier 109, geolocation of the mobile communication device 102, and/or history of wireless communication. At block 314, the message may be transmitted to a communications service provider associated with the radio access network, which may be presented on a display.

In an embodiment, a feedback mobile application 106, 130 may perform the step of engaging in a network communication test between a component of the radio access network and at least one corresponding mobile communication device 102. Embodiments of a network communication test are previously disclosed. A network communication test may be initiated by any of a feedback application 106, 130, 142, an application of the network 120, and/or a third party application. A network communication test may generate connectivity metrics and such metrics (and/or other results from the network communication test) may be associated with feedback information from a feedback application 106, 130, 142 and may be transmitted via the network 120 concurrently with a message and/or included in the message from a feedback application 106, 130, 142. As previously described, a network communication test may execute asynchronously in the background of a mobile communication device 102. In an embodiment, a network communication test may occur automatically when a feedback application 106, 130, 142 is utilized, or may occur based on information from a feedback application 106, 130, 142.

In some embodiments, a feedback application 106, 130, 142 may request and/or engage a plurality of mobile communication devices 102 in a network communication test based on a shared characteristic and/or correlation between the mobile communication devices 102. For example, a family may have a mobile communication device 102 account subscription to use the wireless protocols of a radio access network and the family account comprises three mobile communication devices 102. If a feedback application 106, 130, 142 receives a satisfaction metric (such as one representing a dissatisfaction with communication quality about one of the three mobile communication device 102) and analysis by the feedback application 106, 130, 142 identifies that all three mobile communication devices 102 of the family with the mobile communication device 102 account subscription share the same device manufacturer and geolocation, then a feedback application may request and/or engage all three mobile communication devices 102 from the account in a network communication test. Engagement of all three devices 102 may yield three connectivity metrics that may be used to compare and/or diagnose network connectivity in order to contextualize the satisfaction metric associated with the mobile communication device that first initiated use with the feedback application 106, 130, 142.

In some embodiments, a feedback application 106, 130, 142 may determine and/or receive a textual description of a geographic environment of a mobile communication device 102 and such description may be included in a message generated by a feedback application 106, 130, 142. Embodiments of a textual description of a geographic environment are previously disclosed.

Figure 4:
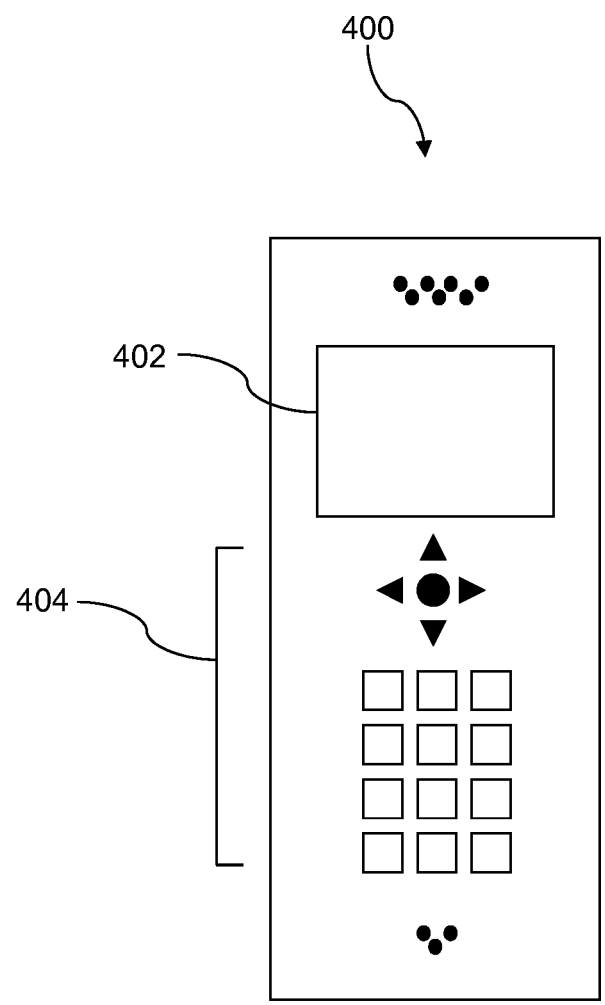
FIG. 4 is an illustration of a mobile communication device according to an embodiment of the disclosure.

Turning now to FIG. 4. FIG. 4 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
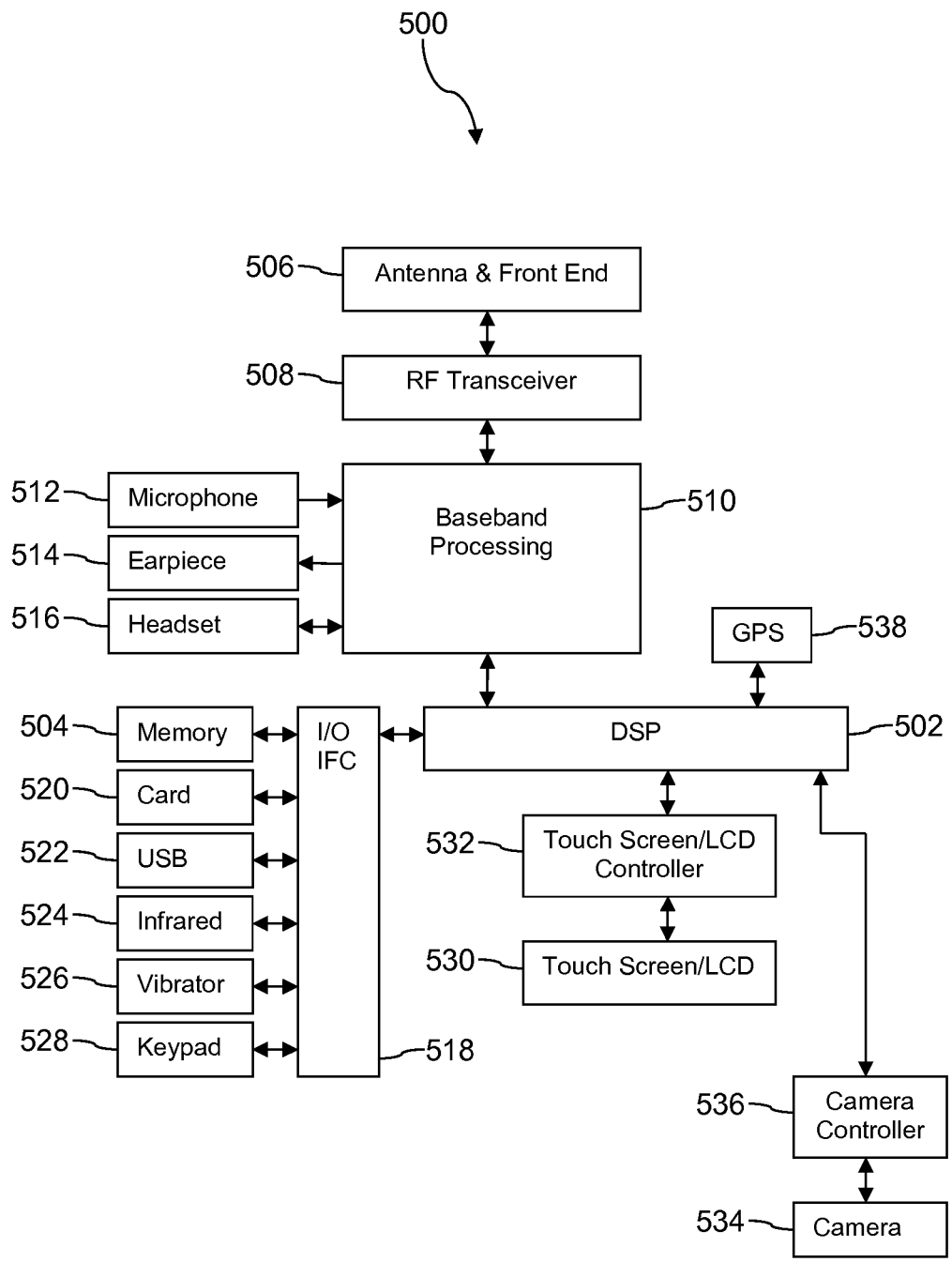
FIG. 5 is a block diagram of a mobile communication device according to an embodiment of the disclosure.

Turning now to FIG. 5. FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
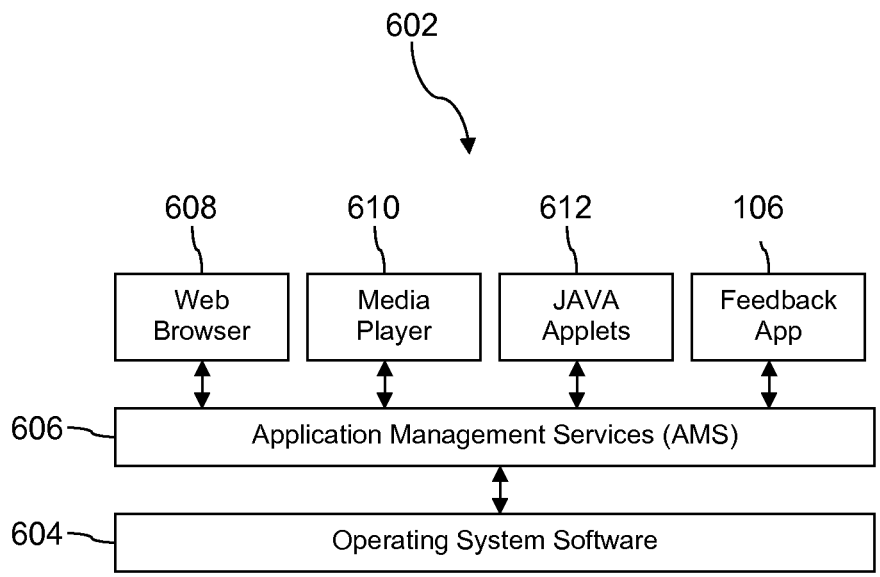
FIG. 6A is a block diagram of a software architecture of a mobile communication device according to an embodiment of the disclosure.

Turning now to FIG. 6A. FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The web browser application 608 may also permit a user to access a web-based application, such as the feedback web application 130 described above. The media player application 610 may be executed by the mobile device 400 to play audio or audiovisual media. The JAVA applets 612 may be executed by the mobile device 400 to provide a variety of functionality including games, utilities, and other functionality. The feedback mobile applications 106, 130 are described above. The feedback web application 130 may be executed by the web browser 608 and/or in conjunction with JAVA applets 612.

Figure 6B:
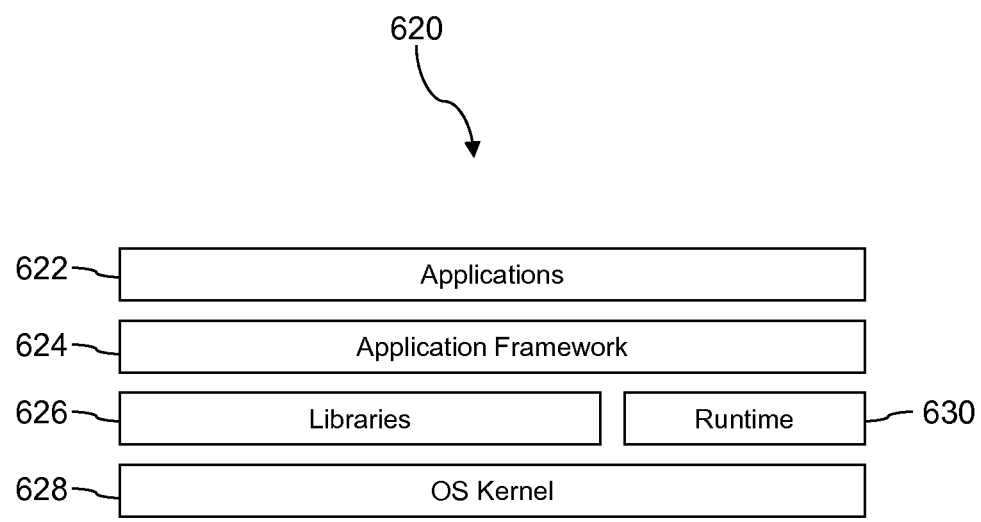
FIG. 6B is a block diagram of another software architecture of a mobile communication device according to an embodiment of the disclosure.

Turning now to FIG. 6B. FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. The feedback mobile application 106 and web application 130 described above may be among the applications 622.

Figure 7:
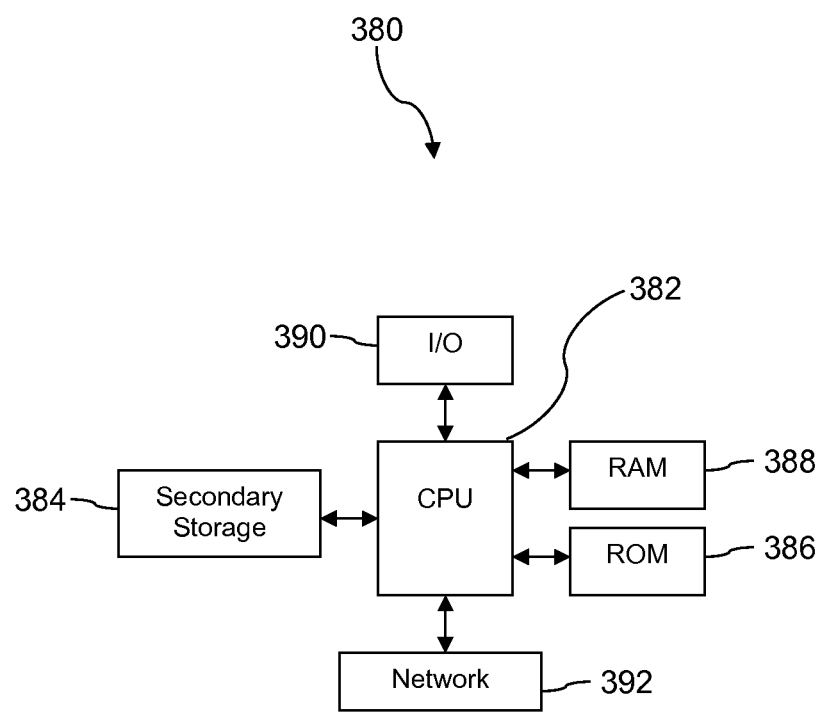
FIG. 7 illustrates an exemplary computer system suitable for implementing the several embodiments of the disclosure.

Turning now to FIG. 7. FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of transceivers, modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), integrated digital enhanced network (iDEN), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, storage—such as the secondary storage 384, the ROM 386, and the RAM 388—may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied and practiced in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented. Unless specifically stated otherwise as apparent from the above discussion, it is appreciated that throughout the description, discussions utilizing terms such as analyzing, processing, computing, calculating, determining or displaying or the like, refer to the action and processes of a computer system, or similar electronic computing device, that manipulates and transforms data represented as physical (electronic) quantities within the computer system memories or registers or other such non-transitory information storage, transmission or display devices.

First, the particular naming of the components, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

The algorithms and operations presented herein are not inherently related to any particular computer, apparatus, or programming language. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. It is appreciated that a variety of programming languages may be used to implement the teachings of the present disclosure as described herein, and any references to specific languages are provided for disclosure of enablement and best mode of the present disclosure. Embodiments of the present disclosure are well suited to a wide variety of computer network systems over numerous topologies. Within this field, the configuration and management of large networks comprise storage devices and computers that are communicatively coupled to dissimilar computers and storage devices over a network, such as the Internet.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of evaluating operational integrity of a radio access network, comprising:

using a computer including a transceiver, a processor, a non-transitory memory, and an application stored in the non-transitory memory that, when executed by the processor, performs steps comprising:

receiving, via a single user selected discrete option that is coarse grained and selectable from a plurality of discrete options, a satisfaction metric from a mobile communication device, wherein the satisfaction metric corresponds to one of the plurality of discrete options and the satisfaction metric provides a user's level of satisfaction with a communication quality between the radio access network and the mobile communication device, determining a mobile communication device identifier that is associated with the mobile communication device, in response to receiving the satisfaction metric via the single user selected discrete option from the mobile communication device, determining a network connection identifier, a geolocation of the mobile communication device, and a history of wireless communication between the mobile communication device and the radio access network, wherein the history spans a predefined timeframe, and identifies a communication type including at least one of voice communication or data communication, analyzing the network connection identifier and history of wireless communication, responsive to analyzing the network connection identifier and history of wireless communication, associating the satisfaction metric with the communication type that includes at least one of voice communication or data communication, in response to receiving the satisfaction metric via the single user selected discrete option from the mobile communication device, initiating a network communication test between the radio access network and another mobile communication device that did not provide the satisfaction metric to a server of a communication service provider associated with the radio access network, responsive to receiving a result of the network communication test, generating a message comprising the result of the network communication test, the satisfaction metric, the mobile communication device identifier, the network connection identifier, the geolocation of the mobile communication device, and the history of wireless communication, and transmitting the message to the server.

2. The method of claim 1, wherein the application configures the computer to perform the further step comprising:

engaging in a separate network communication test between a component of the radio access network and the mobile communication device via the radio access network, wherein the network communication test generates a connectivity metric, and wherein the message further comprises the connectivity metric.

3. The method of claim 1, wherein the application configures the computer to perform the further steps comprising:

determining a subset of a plurality of base transceiver stations based on the network connection identifier, geolocation of the mobile communication device, and history of wireless communication, and presenting a virtual map on an interface that displays the subset of the plurality of base transceiver stations relative to the geolocation of the mobile communication device, wherein the virtual map is configured to receive an input of a satisfaction metric for at least one of the displayed subset of the plurality of base transceiver stations, wherein receiving the satisfaction metric comprises receiving a selection from the displayed subset of the plurality of base transceiver stations, and wherein associating the satisfaction metric with a communication type is based on receiving a selection from the displayed subset of the plurality of base transceiver stations.

4. The method of claim 3, wherein the application configures the computer to perform the further steps comprising:

receiving credentials from a user, and verifying the credentials authorize access to the virtual map on the interface, and wherein presenting a virtual map on the interface is based on verified credentials.

5. The method of claim 1, wherein the computer and the mobile communication device are the same, and wherein the transceiver is a radio transceiver that communicatively couples the mobile communication device to the radio access network by a wireless communication protocol.

6. The method of claim 5, wherein the application configures the computer to perform the further step comprising:

engaging in a network communication test between a component of the radio access network and the mobile communication device via the radio access network, wherein the network communication test generates a connectivity metric, and wherein the message further comprises the connectivity metric.

7. The method of claim 5, wherein responsive to receiving the satisfaction metric, the application configures the computer to perform the further step comprising:

receiving a description of a geographic environment of the mobile communication device that corresponds to at least of one of a vehicle, a building, a transit facility, a sports facility, a public space, or a thoroughfare, and wherein the message further comprises the description of the geographic environment.

8. The method of claim 1, wherein the radio access network promotes radio communication based on at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an integrated digital enhanced network (iDEN) wireless protocol.

9. A system for maintaining a radio access network, comprising:

a feedback data store that comprises a plurality of messages, wherein each of the plurality of messages comprises:

a satisfaction metric received from a mobile communication device and selected via a single user selected discrete option that is coarse grained and selected from among a plurality of discrete options, wherein the satisfaction metric corresponds to one of the plurality of discrete options and the satisfaction metric provides a user's level of satisfaction with a communication quality between the radio access network and the mobile communication device, and wherein the satisfaction metric is associated with at least one of voice communication or data communication, a mobile communication device identifier that is associated with the mobile communication device, and a network connection identifier;

a status data store that comprises metrics including at least one of performance metrics, network upgrade metrics, or trouble ticket metrics, and wherein the metrics of the status data store are associated with at least one base transceiver station; and a server, including a processor, a non-transitory memory, and an application that is stored in the non-transitory memory that, upon execution by the processor, configures the server to:

receive a plurality of messages from the feedback data store, analyze the plurality of messages received from the feedback data store, identify a geolocation in the radio access network of each mobile communication device associated with each message, identify at least one base transceiver station that corresponds to each mobile communication device associated with each message, receive at least one of the metrics from the status data store corresponding to the identified at least one base transceiver station, analyze the plurality of messages received from the feedback data store with at least one of the metrics received from the status data store, wherein the analysis determines that a correlation exists between at least a subset of the plurality of messages and the at least one of the metrics received from the status data store, in response to receiving the satisfaction metric via the single user selected discrete option from the mobile communication device through one of the plurality of messages, initiate and engage in a network communication test via the radio access network with another mobile communication device that did not provide satisfaction metric to the server via one of the plurality of messages in the feedback data store, and responsive to receiving results of the network communication test, generate and transmit a notification to a communication service provider associated with the radio access network based at least partially on the results of the network communication test, and wherein the notification identifies the existing correlation.

10. The system of claim 9,
wherein the mobile communication device identifier identifies at least one of a manufacturer, a serial number, a model number, a subscriber identity module (SIM), an integrated circuit card identifier (ICCID), or a phone number, and
wherein the network connection identifier is associated with the satisfaction metric, and identifies a wireless communication protocol that is based on at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an integrated digital enhanced network (iDEN) wireless protocol.

11. The system of claim 9, wherein the network communication test is between a component of the radio access network and the another mobile communication device, wherein the server is further configured to generate a connectivity metric based on the network communication test, and wherein the generated connectivity metric is associated with the determined correlation.

12. The system of claim 11,
wherein the network communication test is based on at least one attribute of the existing correlation that is shared between the another mobile communication device of the network communication test and the mobile communication device that provided one of the plurality of messages, and
wherein the at least one attribute comprises any of a manufacturer, a developer, a predefined geographic location, a time of day, a customer account, or a planned event.

13. The system of claim 11, wherein the application that is stored in the non-transitory memory and executed by the processor further configures the server to transmit an inquiry to a user associated with a message from the feedback data store, and wherein the inquiry requests the user to provide details about the corresponding message from the feedback data store.

14. A method of evaluating operational integrity of a radio access network, comprising:
receiving, by a server from a plurality of mobile devices, a plurality of messages that each correspond to one of the plurality of mobile communication devices,
wherein each message comprises a mobile communication device identifier, a network connection identifier, and a satisfaction metric that is a coarse grained metric received via a single user selected discrete option that was selected from among a plurality of discrete options,
wherein the coarse grained metric comprises one discrete option selected from a plurality of discrete options, and
wherein the satisfaction metric provides a user's level of satisfaction with a communication quality between the radio access network and a corresponding mobile communication device;
analyzing each message received by the server;
based on the analysis of each message and the single user selected discrete option, identifying, by the server, a geolocation of each of the plurality of mobile communication devices;
responsive to identifying the geolocation of each of the plurality of mobile communication devices, determining, by the server, at least one base transceiver station for each corresponding mobile communication device;
associating, by the server, the determined at least one base transceiver station with a corresponding message;
analyzing, by the server, the plurality of messages, the corresponding at least one base transceiver station, and the corresponding identified geolocations against at least one of performance metrics, network upgrade metrics, or trouble ticket metrics, wherein the at least one of the metrics are associated with the corresponding at least one base transceiver station;
in response to receiving the satisfaction metric via the single user selected discrete option from one of the plurality of mobile communication devices, initiating and engaging in a network communication test, by the server via the radio access network, with another mobile communication device that did not provide the server with any satisfaction metric via any one of the plurality of messages;
generating, by the server, a request for a detailed explanation about the satisfaction metric that corresponds to one of the plurality of messages based on results from the network communication test; and
transmitting the request to the one of the plurality of mobile communication devices associated with the one of the plurality of messages received by the server.

15. The method of claim 14, wherein the plurality of discrete options correspond to a plurality of visual representations displayable and selectable on an interface.

16. The method of claim 14, wherein the request for a detailed explanation requests identification of a description of a geographic environment that corresponds to at least one of a vehicle, a building, a transit facility, a sports facility, a public space, or a thoroughfare.

17. The method of claim 14, wherein the radio access network promotes radio communication based on at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an integrated digital enhanced network (iDEN) wireless protocol.

18. The method of claim 14, further comprising:
based on the analysis of each message, determining whether a correlation exists between at least a subset of the plurality of messages and the corresponding metrics associated with the at least one base transceiver station, wherein the correlation exists by exceeding a predefined threshold; and responsive to the determination that a correlation exists, sending a notification to a communication service provider associated with the radio access network, wherein the notification comprises an identification of the determined correlation.

19. The method of claim 18, further comprising:

wherein the network communication test is conducted between the another mobile communication device and a component of the radio access network, and wherein the network communication test mimics a type of communication associated with the one of the plurality of mobile communication devices that is transmitted the request for a detailed explanation, and based on the network communication test, generating a connectivity metric.

20. The method of claim 19, wherein the network communication test is based on at least one attribute of the existing correlation that is shared with the another mobile communication device of the network communication test, and wherein the at least one attribute comprises any of a manufacturer, a developer, a predefined geographic location, a time of day, a customer account, or a planned event.

\* \* \* \* \*